USOO6775100B1

(12) United States Patent
Belser et al.

(10) Patent No.: US 6,775,100 B1
(45) Date of Patent: Aug. 10, 2004

(54) LASER ASSISTED TRACK WIDTH DEFINITION AND RADIAL CONTROL WITH MAGNETIC RECORDING

(75) Inventors: Karl A. Belser, San Jose, CA (US); Terry McDaniel, Morgan Hill, CA (US); Edward C. Gage, Apple Valley, MN (US); James Durnin, Apple Valley, MN (US); Lori G. Swanson, Bloomington, MN (US); Christina L. Hutchinson, Apple Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/280,414

(22) Filed: Mar. 29, 1999

Related U.S. Application Data

(63) Continuation-in-part of application No. 08/851,382, filed on May 5, 1997, now Pat. No. 5,889,641.
(60) Provisional application No. 60/126,729, filed on Mar. 29, 1999, provisional application No. 60/115,771, filed on Jan. 13, 1999, provisional application No. 60/115,094, filed on Jan. 7, 1999, provisional application No. 60/113,059, filed on Dec. 21, 1998, provisional application No. 60/111,099, filed on Dec. 4, 1998, provisional application No. 60/082,077, filed on Apr. 17, 1998, and provisional application No. 60/081,253, filed on Apr. 9, 1998.

(51) Int. Cl.$^7$ ............................................. G11B 7/30
(52) U.S. Cl. ......................................... 360/137
(58) Field of Search ..................... 360/137, 314, 360/315, 114, 114.01, 114.08, 114.09, 135; 369/44.11, 44.12, 44.17, 44.18, 44.19, 94, 95, 96, 274, 275.3, 275.1, 275.2, 288, 286, 280, 278, 277, 275.4

(56) References Cited

U.S. PATENT DOCUMENTS 4,633,450 A    12/1986    Gueugnon et al. ............ 369/13

| 4,633,451 A | 12/1986 | Ahn et al. ..................... 369/14 |
| 4,639,906 A | 1/1987 | Goto ............................ 369/14 |
| 4,796,226 A | 1/1989 | Valette ........................ 365/122 |
| 4,893,207 A | 1/1990 | Maury et al. ............... 360/114 |
| 4,961,123 A | 10/1990 | Williams et al. ............ 360/131 |
| 5,041,922 A | 8/1991 | Wood et al. ................. 360/55 |
| 5,067,039 A | 11/1991 | Godwin et al. ............. 360/135 |
| 5,199,090 A | 3/1993 | Bell ............................. 385/33 |
| 5,237,548 A | 8/1993 | Muchnik ...................... 369/13 |
| 5,241,520 A * | 8/1993 | Ohta et al. ................... 369/13 |
| 5,317,800 A | 6/1994 | Fedeli et al. ................. 29/603 |
| 5,325,244 A | 6/1994 | Takano et al. ........... 360/77.03 |
| 5,353,268 A | 10/1994 | Hintz .......................... 369/13 |

(List continued on next page.)

FOREIGN PATENT DOCUMENTS

| EP | 291248A2 A3 | 5/1988 |
| EP | 0356201A2-B1 A3 | 8/1989 |
| EP | 0432976 A2 | 12/1990 |
| EP | 0 432 976 A2 * | 6/1991 |
| EP | 0470863 A1 | 8/1991 |
| EP | 0779610A2 A3 | 12/1996 |
| JP | 2-61814 | 3/1990 |

OTHER PUBLICATIONS

IBM Technical Disclosure Bulletin "Thermomagnetic writing/magnetoresistive reading on ferromagnetic disk" vol. 34 No. 2 Jul. 1991.

(List continued on next page.)

*Primary Examiner*—Tianjie Chen
(74) *Attorney, Agent, or Firm*—Alan G. Towner, Esq.; Pietragallo, Bosick & Gordon

(57) ABSTRACT

The present invention provides for the enhancement of the storage capacity of a data disk drive while reducing optical path optics, electronics and/or the mass and complexity of associated read/write heads. The system utilizes light transmitted by optical elements to servo track a data disk and to heat the data disk during reading and writing of data, and magnetic elements for actual reading and writing.

26 Claims, 22 Drawing Sheets

U.S. PATENT DOCUMENTS

| | | | | |
|---|---|---|---|---|
| 5,368,986 A | | 11/1994 | Terao | 430/270 |
| 5,392,181 A | * | 2/1995 | Lhureau et al. | 360/114.09 |
| 5,432,770 A | | 7/1995 | Yashima | 369/100 |
| 5,440,530 A | | 8/1995 | Fedeli et al. | 369/13 |
| 5,635,267 A | * | 6/1997 | Yamada et al. | 428/64.4 |
| 5,656,385 A | | 8/1997 | Nakajuma | 428/694 |
| 5,870,260 A | | 2/1999 | Davies et al. | 360/113 |
| 5,986,978 A | * | 11/1999 | Rottmayer et al. | 369/13 |
| 5,999,512 A | * | 12/1999 | Furuta | 369/275.1 |
| 6,044,056 A | * | 3/2000 | Wilde et al. | 369/119 |
| 6,075,673 A | * | 6/2000 | Wilde et al. | 360/103 |
| 6,094,938 A | * | 8/2000 | McNeil et al. | 369/112 |

OTHER PUBLICATIONS

IBM Technical Disclosure Bulletin "High Density Magnetic Storage Using An Atomic Force Microscope With Optical Detection" vol. 34 No. 7B Dec. 1991.

Katayama et al., "New Magnetic Recording Media Using Laser Assisted Read/Write Technologies," presented in paper 13–B–05 at MORIS–Magneto–Optical Recording International Symposium '99, on Jan. 10–13, 1999 at Monterey, CA.

Saga et al., "A New Perpendicular Magnetic Recording Method With A Magnetic–Optical Common Preformat," presented in paper 13–B–03 at MORIS–Magneto–Optical Recording International Symposium '99, on Jan. 10–13, 1999.

Nemoto et al. "High Density ThermoMagnetic Recording On Flux Detectable RE–TM Media," presented in paper 13–B–04 at MORIS–Magneto–Optical Recording International Symposium '99, on Jan. 10–13, 1999.

Saga et al., "A New Recording Method Combining Thermo–Magnetic Writing And Flux Detection," presented in paper Pd–08 at ISOM–International Symposium On Optical Memory '98, on Oct. 20–22, 1998 at Tsukuba, Japan.

Nemoto et al.,"Exchange–Coupled Magnetic Bilayer Media For Thermomagnetic Writing And Flux Detection" presented in paper Pd–09at ISOM–International Symposium On Optical Memory '98, on Oct. 20–22, 1998 at Tsukuba, Japan.

* cited by examiner

HEAD OPTIONAL DESIGN WITH A THIN WAFER BONDED ONTO A THICKER SUBSTRATE TO CREATE THE BOTTOM BLOCK

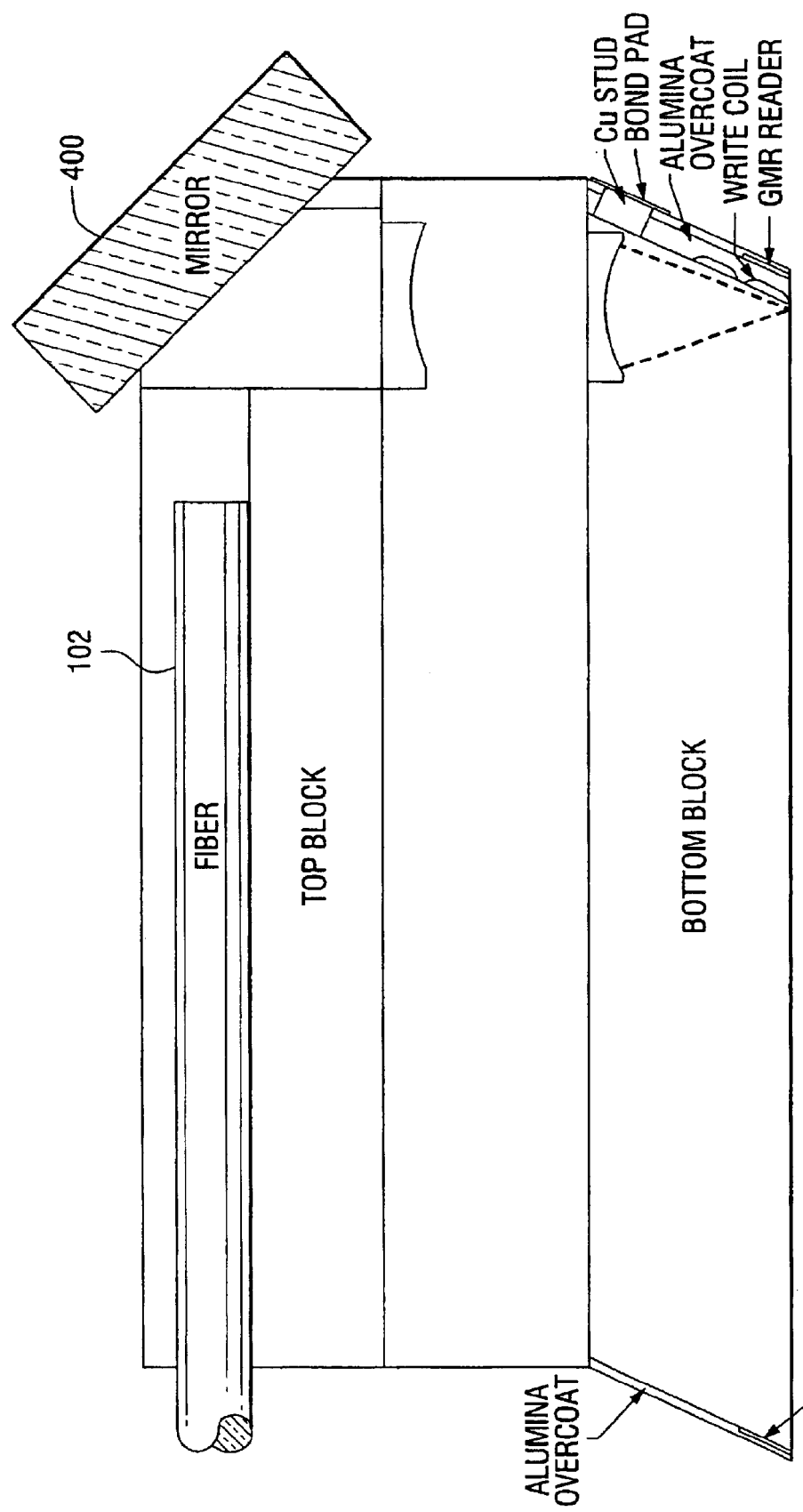
FIG. 4I HEAD OPTIONAL DESIGN WITH ERASE MAGNET ON LEADING EDGE

GROOVED MEDIA TEMPERATURE PROFILE AFTER 90 NS
1.7 DEGREES (TOP RIGHT) IN 0.2 DEGREE STEPS

GROOVED MEDIA TEMPERATURE PROFILE AFTER 150 NS
0.9 DEGREES (TOP RIGHT) IN 0.15 DEGREE STEPS

FLAT MEDIA TEMPERATURE PROFILE AFTER 60 NS
1.5 DEGREES (TOP RIGHT) IN 0.1 DEGREE STEPS

GROOVED MEDIA TEMPERATURE PROFILE AFTER 60 NS
3.0 DEGREES (TOP RIGHT) IN 0.35 DEGREE STEPS

LASER ASSISTED TRACK WIDTH DEFINITION AND RADIAL CONTROL WITH MAGNETIC RECORDING

CROSS-REFERENCE TO RELATED APPLICATIONS

This application claims priority from and is a continuation-in-part of U.S. application Ser. No. 08/851,382, filed 5 May 1997, now U.S. Pat. No. 5,889,641 which is incorporated herein by reference; and this application claims priority from Provisional Application No. 60/082,077, filed 17 Apr. 1998, which is incorporated herein by reference; and this application claims priority from Provisional Application No. 60/111,099, filed 4 Dec. 1998, which is incorporated herein by reference; and this application claims priority from Provisional Application No. 60/113,059, filed to 21 Dec. 1998, which is incorporated herein by reference; and this application claims priority from Provisional Application No. 60/081,253, filed 9 Apr. 1998, which is incorporated herein by reference; and this application claims priority from Provisional Application No. 60/115,094, filed 7 Jan. 1999, which is incorporated herein by reference; and this application claims priority from Provisional Application No. 60/115,771, filed 13 Jan. 1999, which is incorporated herein by reference; and this application claims priority from Provisional Application No. 60,126,729 entitled "Method of Fabricating a Wafer Based Thermally Assisted or Optically Assisted Winchester Head," filed 29 Mar. 1999 concurrently herewith, which is incorporated herein by reference.

FIELD OF THE INVENTION

The present invention relates to data storage and retrieval systems that utilize optical and magnetic elements.

BACKGROUND

In prior art magneto-optical (MO) disk drives, data is read as a clockwise or counter-clockwise polarization rotation imposed on a polarized laser light by the up or down orientations of magnetic domains within an area of stored data. The minimum area that the data can comprise is a function of the size of an optical spot formed by the polarized light. The information embedded in the polarization rotation requires an optical readout means. The optical readout means in the prior art includes a plurality of bulky and complex optical elements, some of which are located on a magneto-optical head. The optical elements can degrade the signal to noise ratio (SNR) of the information signal obtained from the polarization rotation.

Magnetic based disk drives are also well known in the art. In magnetic drives, magneto-resistive elements on magnetic heads are typically used. Recent advances in magnetic recording technology have provided magnetic heads that use giant magneto-resistive (GMR) technology; see, for example, "Giant Magnetoresistance: A Primer", by Robert White, IEEE Transactions On Magnetics, Vol. 28, No. 5, September 1992, incorporated herein by reference. GMR heads may be manufactured to be more sensitive to magnetic fields than conventional magneto resistive heads. GMR technology has also been incorporated with Spin-Valve structures that are well known in the art.

Magnetic storage drive technology is subject to the "super paramagnetic limit", which simply states that when longitudinally oriented (in plane) magnetic domains are written in granular thin film metallic media, these domains will tend to demagnetize each other at some high flux reversal density and at high temperature.

Today the smallest mark written by a 220 KBPI PR-4 recording system, at say a 2 $\mu$m track pitch, is about 0.1 $\mu$m long along the track by 1.8 $\mu$m wide across the track. The north-to-south poles of the longitudinal domains are oriented along the track. Typically, there are at least four limitations encountered in prior art magnetic storage drive technology when trying to make the track pitch more narrow, including:

1) For tracking, a very high servo error rejection needs to be implemented, which requires a coarse and fine tracking actuator, for example, a crossover frequency of greater than 2 Khz is required for a track pitch of 1 $\mu$m.

2) The photolithographic tolerances for making a read/write head is limited to about 10% of the thickness of the head permalloy poles. If the poles are about 4 $\mu$m thick, the head tolerances are about 0.4 $\mu$m.

3) A typical prior art head causes side-erasure of data tracks of about 0.3 $\mu$m. This side erasure is desired for proper operation during the record/playback process so as to eliminate old information. Because, side-erasure scales with the head gap width, the gap width will be a function of a desired magnetic domain density.

4) The writing of the radial and circumferential position sensing patterns (servo writing) is not very accurate because of disk flutter and spindle bearing non-repeatable runout. One can typically expect a servo writing accuracy of about 0.2 $\mu$m with 0.8 mm thick 3.5 inch disks spinning on a ball bearing spindle.

What is needed therefore is an improvement that takes into account the limitations of the prior art magnetic and optical drive technologies.

Summary Of The Invention

The present invention provides for the enhancement of the storage capacity of a data disk drive while reducing optical path optics, electronics and/or the mass and complexity of associated read/write heads. The system utilizes light transmitted by optical elements to servo track a data disk and to heat the data disk during writing and reading of data, and inductive and magnetic elements for actual writing and reading. In doing so, the present invention provides an improved signal-to-noise-ratio (SNR) for a signal that is representative of data recorded as regions of magnetic domain marks on the data disk as well as improved storage capacity of the disk drive.

The data storage disk may include depressions and/or raised features, which may be filled and/or polished with various materials. In this way, a smooth surface is provided for the read/write head that is aerodynamically maintained in a flying condition very close to the data disk surface. By providing a smooth surface, accumulation of contaminants may be reduced or eliminated. The filler material may be made to be reflective such that an optical signal reflected from the depressions and/or raised features can be provided with a larger amplitude. The reflection of the light from the material used for filling the depression and/or raised feature may be used for sector identification and track following. Additionally, the depressions and/or raised features may be made to present a reflective area that is proportional to the radius of the data disk at which they are disposed. Consequently, the frequency content and/or amplitude variations of the reflected optical signal may be minimized over a radius of the data disk.

In the present invention, the data storage disk may further comprise a set of channels and/or mesas disposed in-between data tracks comprising the data storage disk. The channels and/or mesas may be used to thermally channel and direct the thermal effects of the light applied to the data disk such that the shape of data domain marks that are used to store data along the data tracks may be confined in a cross track direction and defined to more accurately match a preferred rectangular or square geometry. The storage density and SNR may consequently be increased. The channels and/or mesas may be also be filled with a filler material.

In addition, the present invention may comprise a recording and playback system in which data track edges are defined thermally and in which a tracking mechanism utilizes a radial motion of a focused laser spot comprising: a flying head, said flying head disposed above a storage disk and the tracking mechanism may comprising: at least one optical element for producing said focused laser spot, said at least one optical element disposed next to at least one magnetic field writing element, said at least one magnetic field writing element disposed next to at least one magnetic field sensing element; and a storage disk; said storage disk comprising: servo sector information, said servo sector information encoding coarse and fine radial and rotational positions on said storage disk; heat directing features disposed between said data tracks, and a thin film that is designed to change magnetic properties when heated during recording and writing of data. The thin film may comprise at least one layer of amorphous magnetic material or a readout layer and a storage layer.

The present invention may include an assembly for selectively directing a light along an optical path between a source of the light and a storage location of a storage media, to comprising: at least one optical element, the optical element directing the light along the optical path and toward the storage location; and at least one magnetic element, wherein the magnetic element operates in timed cooperation with the light so as to access the storage location.

The at least one optical element and the at least one magnetic element may be coupled to a flying head.

The at least one magnetic element may comprise a magneto-resistive element and/or a magnetic field generating element.

The at least one optical element may comprise an optical fiber, a steerable mirror, an objective optics. The steerable mirror may comprise a micro-machined mirror.

The storage location may comprise a region of data comprising magnetic domains (data domain mark), wherein the light heats the storage location, wherein the at least one magnetic element comprises a magnetic field detecting element, and wherein the at least one magnetic element accesses the heated storage location by detecting a magnetic flux from the data domain mark.

The at least one magnetic element may comprise a magneto-resistive element, wherein the magneto-resistive element accesses the data domain mark by detecting a magnetic flux from the data domain mark.

The magneto-resistive element may comprise a Giant Magneto-Resistive or Spin Valve element.

The data domain mark may comprise a vertical or longitudinal orientation. The at least one magnetic element may comprise a magnetic field directing element, wherein the light heats the storage location, wherein the at least one magnetic element comprises a magnetic field directing element, and wherein the at least one magnetic element accesses the heated storage location by directing a magnetic flux to the data domain mark.

The magnetic field generating element may comprise a magnetic field directing element and a conductor.

The storage media may comprise a servo pattern, wherein the light is directed to the storage location based on a reflection of the light from the servo pattern. The servo pattern may comprise a depression or a raised feature.

The storage media may comprise a center, a plurality of data tracks, and a plurality of heat directing features; wherein the plurality of data tracks and the plurality of heat directing features are disposed about the center; and wherein alternating ones of the plurality of heat directing features are disposed between respective alternating ones of the data tracks. The heat directing features may comprise channels and/or mesas.

The present invention may comprise a method for selectively directing a light along an optical path between a source of the light and a storage location of a storage media, comprising the steps of: directing the light to the storage location to heat the storage location; and accessing the storage location after a period of time during which the heat is applied to the storage location.

The method may further include the step of accessing the storage location by detecting magnetic flux from the storage location and/or directing magnetic flux to the storage location. In the present invention the storage media may comprise data tracks having an in track and a cross track direction, and may further comprise the step of defining the cross track dimension of the magnetic domain marks through application of the heat. The method may further comprise the step of defining a width of the magnetic domain marks through application of the heat.

This present invention is not to be limited to the specific embodiments disclosed in this application or any equivalent thereof, as the invention, as described, may be used in any of a number ways, known and unknown at this period of time.

DETAILED DESCRIPTION

The present invention provides for the enhancement of the storage capacity of a data disk drive while reducing optical path optics, electronics and/or the mass and complexity of associated read/write heads. The system utilizes light transmitted by optical elements to servo track a data disk and to heat the data disk during writing and reading of data, and inductive and magnetic elements for actual writing and reading.

The data storage disk may include depressions and/or raised features, which may be filled and/or polished with various materials. In this way, a smooth surface is provided for the read/write head that is aerodynamically maintained in a flying condition very close to the data disk surface. By providing a smooth surface, accumulation of contaminants may be reduced or eliminated. The filler material may be made to be reflective such that an optical signal reflected from the depressions and/or raised features can be provided with a larger amplitude. The reflection of the light from the material used for filling the depression and/or raised feature may be used for sector identification and track following. Additionally, the depressions and/or raised features may be made to present a reflective area that is proportional to the radius of the data disk at which they are disposed. Consequently, the frequency content and/or amplitude variations of the reflected optical signal may be minimized over a radius of the data disk.

In the present invention, the data storage disk may further comprise a set of channels and/or mesas disposed in-between data tracks comprising the data storage disk. The channels and/or mesas may act to thermally channel and direct the thermal effects of the light applied to the data disk such that the shape of data domain marks that are used to store data along the data tracks are confined in a cross track direction and defined to more accurately match a preferred rectangular or square geometry. The channels and/or mesas may also be filled with a filler material.

This present invention is not to be limited to the specific embodiments disclosed in this application or any equivalent thereof, as the invention, as described, may be used in any of a number ways, known and unknown at this period of time.

Figure 1:
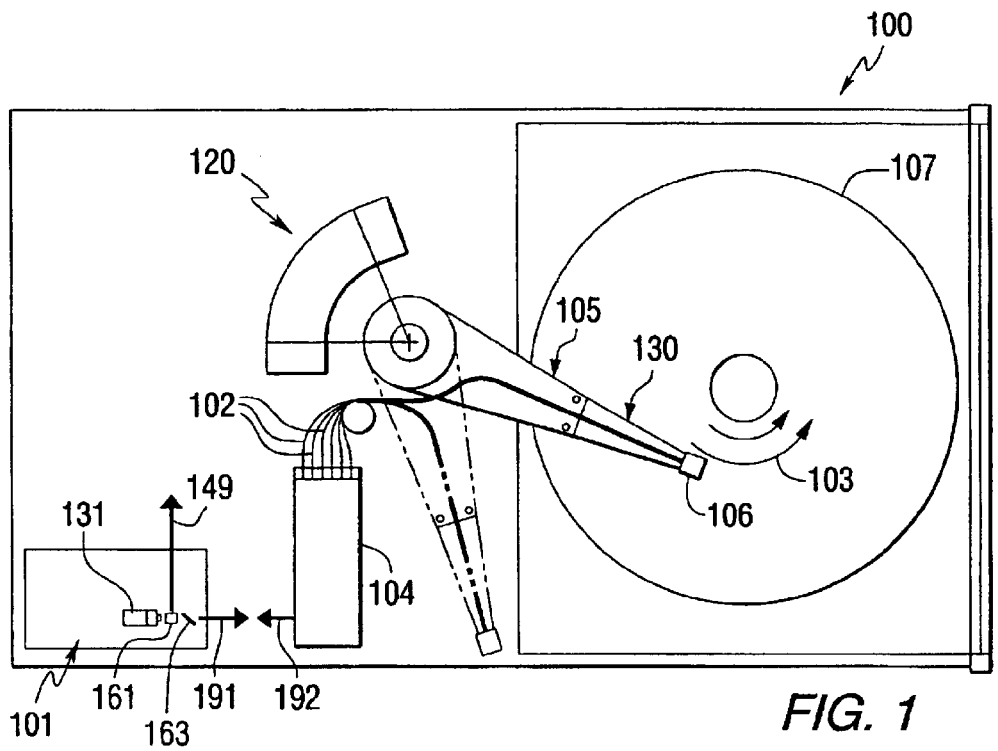
In FIG. 1, basic elements of a data storage system are seen.

Referring now to FIG. 1, basic elements of a data storage system incorporated as part of the present invention are seen. FIG. 1 shows a storage system 100 comprising an actuator assembly 120 which moves a flying read/write head 106 for writing and reading of data to and from a plurality of radially spaced apart concentric and circular data tracks 103 on at least one rotating data storage disk 107.

Figure 2A:
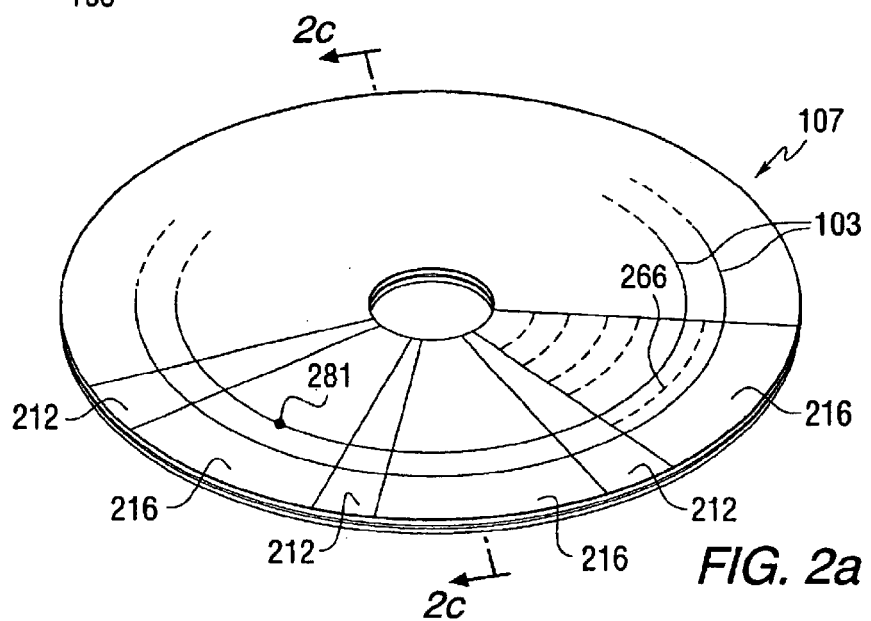
In FIG. 2a, a disk of the present invention is seen.
Figure 2C:
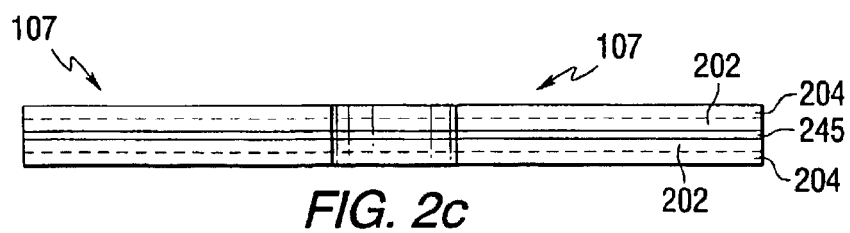
In FIG. 2c, views of storage and readout layers of the present invention are seen.

Referring now to FIG. 2a, a disk of the present invention is seen in further detail. For the purposes of describing an embodiment of the present invention, a particular data architecture of the disk 107 is described.

The disk 107 is circumferentially divided into a plurality of uniformly and circumferentially spaced apart wedge shaped servo sectors 212 extending contiguously outward from a center.

A corresponding plurality of wedge shaped and spaced apart data sectors 216 are interposed circumferentially between and adjacent to each of a respective pair of servo sectors 212. The data sector 216 includes a plurality of data bits (marks) comprised of lo magnetic domains 281 that are used to store information on the disk 107. The magnetic data domain 281 marks are separated with a constant linear spacing along the data tracks 103. The data tracks 103 are spaced apart radially with a nominal constant radial data track pitch Tp.

Referring now to FIGS. 1 through 4a–f, a data storage system of the present invention will now be described.

FIGS. 1 through 4a–f are provided to show a general structure of an exemplary storage system 100, which comprises optical elements for reading the servo sectors 212, as well as optical, inductive, and magnetic elements for writing and reading data bits to and from the data sectors 216.

As seen in FIG. 1, system 100 includes a set of flying heads 106 that are adapted for use with a set of double sided disks 107. One flying head 106 is provided for each surface of disk 107. The heads 106 are coupled to a rotary actuator magnet and coil assembly 120 by a suspension 130 and actuator arm 105 by which they are positioned over the surfaces of the disks 107. In operation, the disks 107 are rotated by a spindle motor to generate aerodynamic lift forces between the flying heads 106 and the rotating disk 107. The aerodynamic forces maintain each flying head 106 in a flying condition above the surface of each disk 107. The lift forces are opposed by equal and opposite spring forces supplied by the suspensions 130. During non-operation, each flying head 106 is maintained statically in a storage condition away from the surface of the disk 107, typically on a ramp (not shown) away from the surface of the disk 107.

System 100 further includes a laser optics assembly 101, an optical switch 104, and a set of optical fibers 102. Each set of optical fibers 102 are coupled along a respective one of the set of actuator arm's 105 and suspensions 130 to a respective one of the set of flying heads 106.

The laser optics assembly 101 includes a diode laser source 131 of a type well known in the art. The laser optics assembly 101 directs the outgoing laser beam 191 from the laser source 131 towards an optical switch 104. The laser optics assembly 101 receives the reflected laser beam 192 and processes the signal for output as a signal 149.

Figure 3:
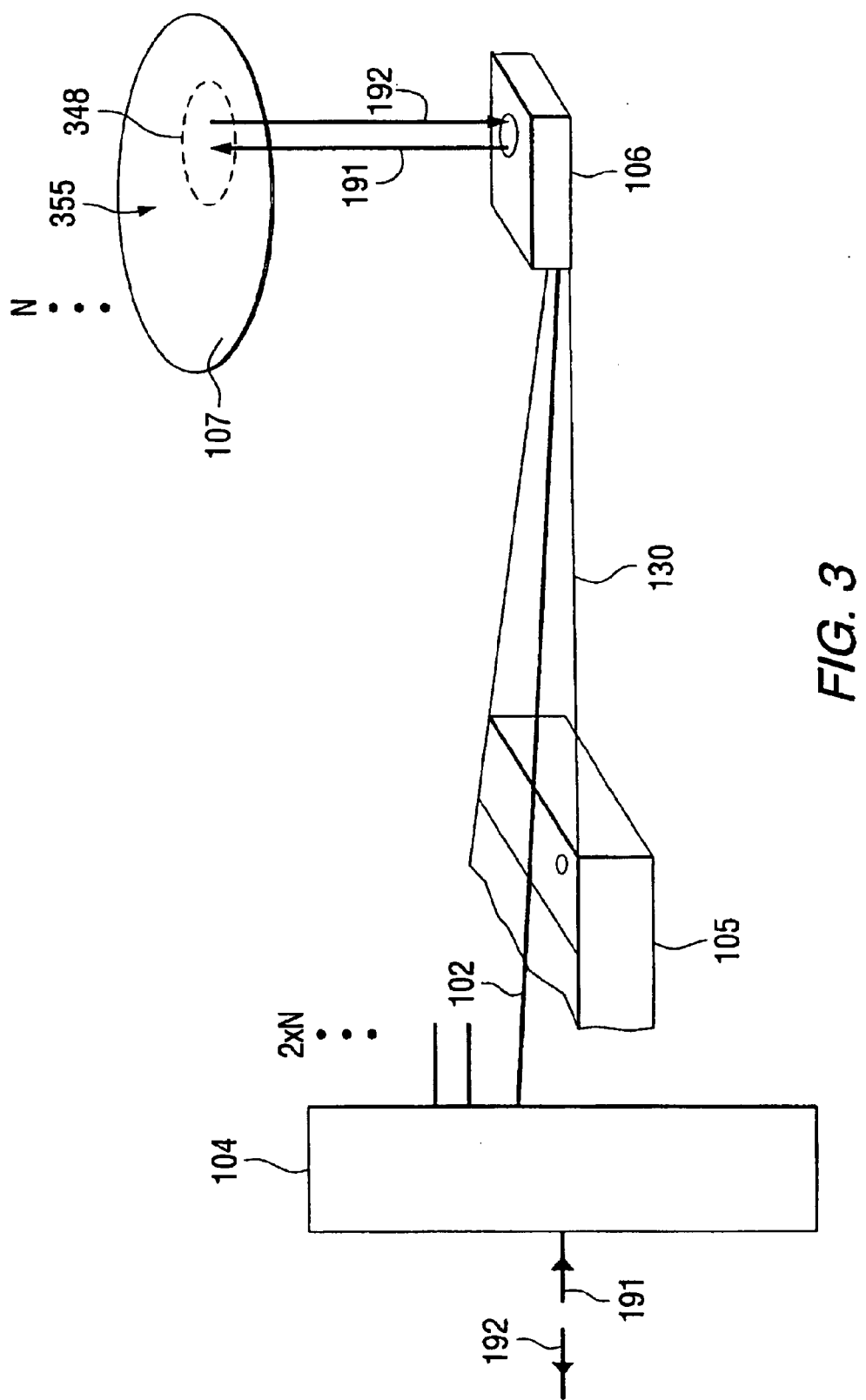
In FIG. 3, a diagram showing a representative optical path is seen.

Referring now to FIG. 3, there is seen a diagram showing a representative optical path of the system 100 in further detail. In the preferred embodiment, the representative optical path includes: the optical switch 104, one of the set of optical fibers 102, and one of the set of flying heads 106. The optical switch 104 provides sufficient degrees of selectivity for directing the outgoing laser beam 191 toward a respective proximal end of a respective optical fiber 102. The outgoing laser beam 191 is directed by the optical fiber 102 to exit a respective distal end so as to pass through the flying head 106 onto a respective disk 107.

The aforementioned optical path is bi-directional in nature. Accordingly, a reflected laser beam 192 is directed through the flying head 106 and towards the distal end of the optical fiber 102. The reflected laser beam 192 propagates along the optical fiber 102 to exit at its proximal end and is selectively routed by the optical switch 104 for transmission to laser-optics assembly 101 for subsequent conversion to a signal representative of the servo information embedded in the servo sectors 212.

Figure 2B:
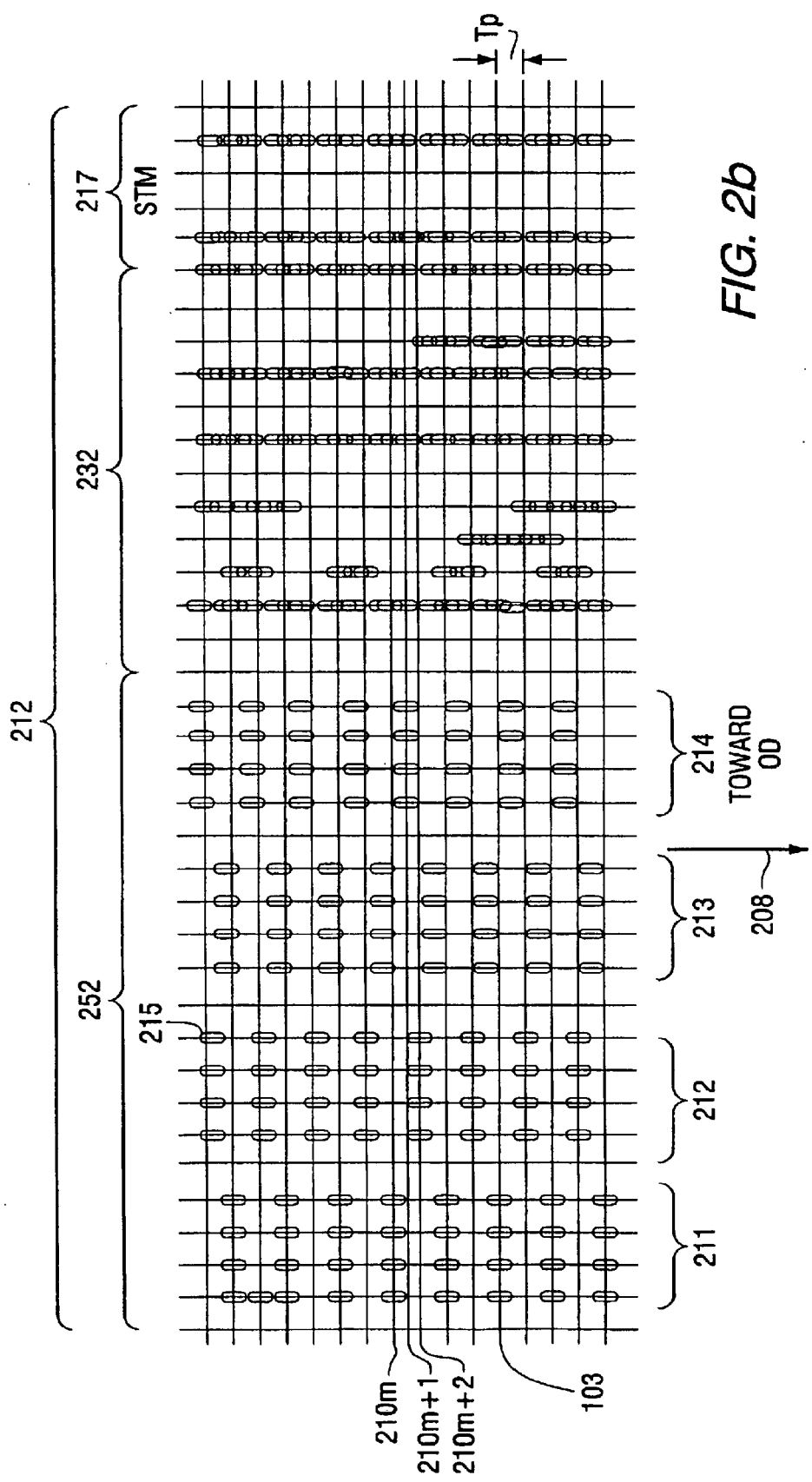
In FIG. 2b, a typical servo sector is seen.

Referring now to FIG. 2b, a typical servo sector in seen. In FIG. 2b, there is shown a magnified portion of a typical servo sector 212. The following description will briefly summarize the reasons for providing the outgoing laser beam 191 to selectively access information comprising the servo sectors 212. The servo sectors 212 comprise encoded servo information that includes a coordinate reference system that enables access to data in data sectors 216 of the disk 107. In the preferred embodiment, the data tracks 103 that span each servo sector 212 contain three kinds of encoded information: servo timing marks (STM) 217, data track address marks 232, and fine circumferential position error signal (PES) servo burst marks 252. As described below, the servo sectors 212 may be embossed on a surface of a substrate 245 (FIG. 2c) comprising the disk 107 or otherwise formed to comprise depressions or raised features. Embossing and/or molding the disk 107 is understood to provide manufacturing and cost advantages. The type of materials from which disks may be formed has been well identified and described in a number of published documents as is well known in the art.

In one embodiment, the servo information comprises a combination of raised features and depressed features, with a representative depressed feature referenced as a pit 215. It is understood that in another embodiment, the function provided by the pit 215 could be provided by a raised feature. Furthermore, although, the pits 215 are illustrated as being elongated in shape, it is understood that the pit 215 may comprise other shapes, for example, circular or similar shape. In the preferred embodiment, the pits 215 are written along certain ones of a plurality of master tracks 210m, 210m+1, 210m+2 . . . . The master tracks are concentrically disposed and centered and equally spaced and separated by a track pitch Tp/2, wherein the data tracks 103 comprise alternate ones of the plurality of master tracks.

The servo timing marks comprise a first pattern of pits 215 that are written from the outer diameter to the inner diameter and the certain ones of the master tracks 210m, 210m+1, 210m+2 . . . to form continuous radial lines. The disk drive control system (DDCS) of the disk drive 100 may be configured to recognize the first pattern as marking the start of the servo sector 212 each time the first pattern is detected.

In the preferred embodiment, the data track address marks 232 comprise a second pattern of individual pits 215. The second pattern is decoded by the DDCS and used as address pointers for identification of particular data tracks 103. In the preferred embodiment, the position error marks 252 comprise a third pattern of individual pits 215. The third pattern comprises four concentrically disposed segments 211, 212, 213, 214. The third pattern is used to derive position error signals for performing position adjustments of the read/write head 106 over a particular data track 103 during track seeking and following as is well known in the art.

Each pit 215 may characterized by three dimensions that are controlled: a radial pit width (erpw), a circumferential pit width (ecpw) and a pit depth (epd). The control and uniformity of pit position, and dimensions establish a basis for the DDCS to compensate for variability of user recorded data by appropriate control algorithms.

The servo sector 212 of the present invention may or may not utilize an automatic gain control field (AGC). Preferably, an AGC field is not used so to minimize the size of the servo sector or equivalently to increase the data storage capacity of the data sectors 216.

In the prior art, diffraction information may be used to maintain a position of a head over a particular data track of a disk. However, in a system that uses optical fibers, diffraction information may be undesirably degraded by the optical properties of the optical fibers. The present invention uses, instead, reflectivity information from the pits 215. The pits 215 destructively interfere with the reflected laser beam 192 such that the beam's amplitude changes in proportion to light reflected from the disk 107. The changes in amplitude are embodied in the reflected laser beam 192 and are summed by well known optical and electrical detection techniques for output as the signal 149. The signal 149 is used as a position error signal (PES) to maintain the position of the head 106 over the disk 107. It is understood, of course, that in a system that does not utilize optical fibers, diffraction information from a data disk could be used for servo tracking and, thus, the present invention would not be limited to pits 215, but could instead comprise the use of diffraction information from other servo tracking features, for example, channels and the like.

Figure 4A:
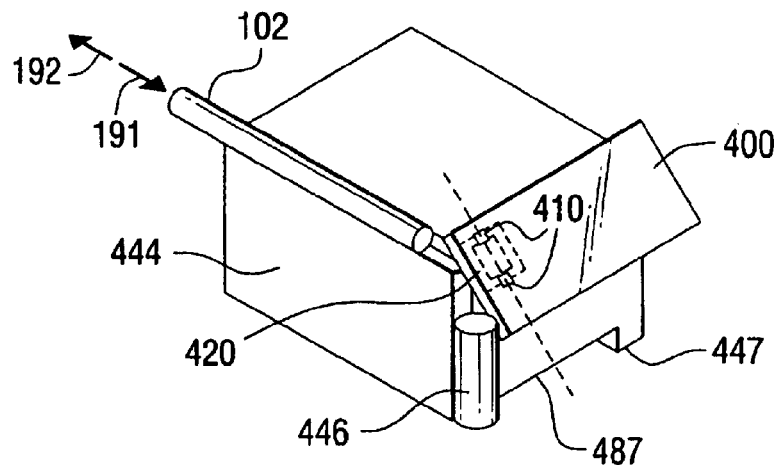
In FIGS. 4a–n, various views of a head of the present invention are seen.
Figure 4B:
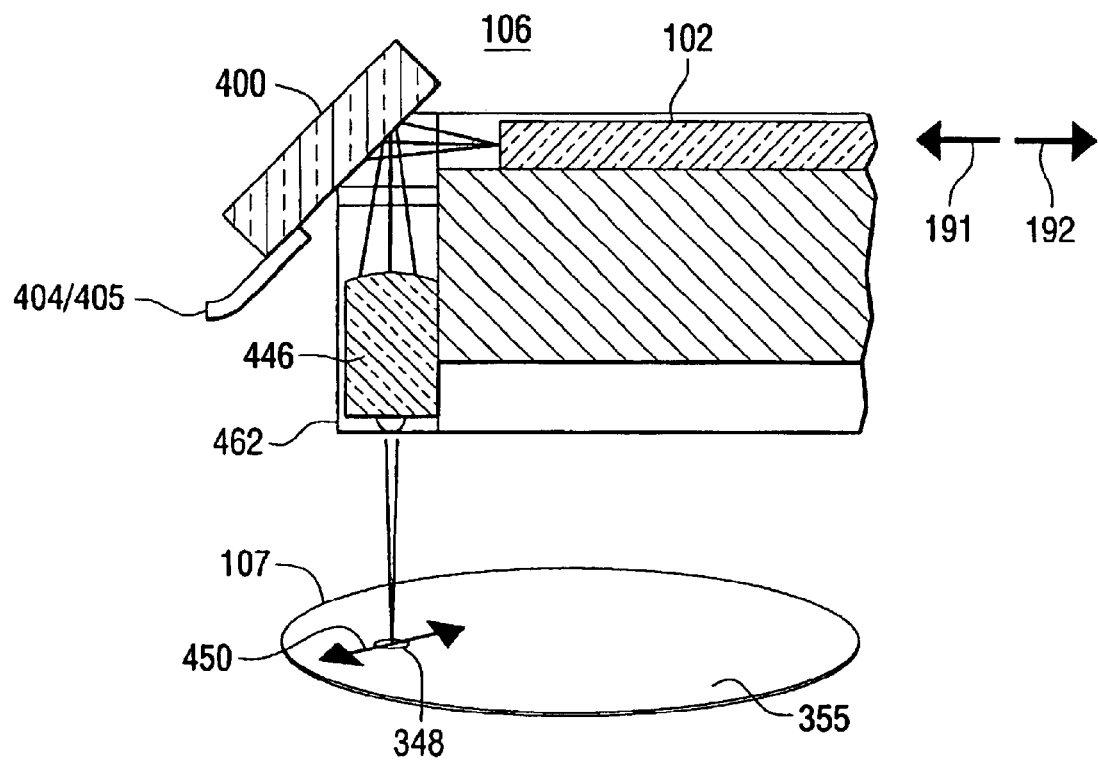
Figure 4D:
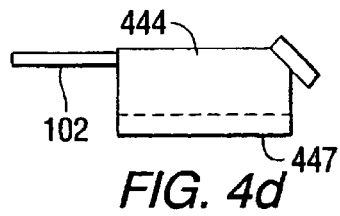
Figure 4E:
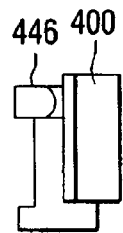
Figure 4F:
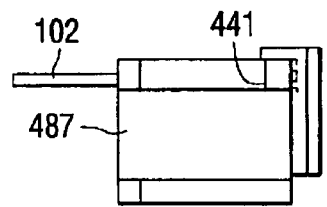
Figure 4C:
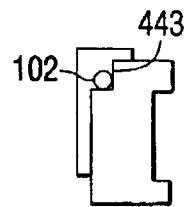
Figure 4G:
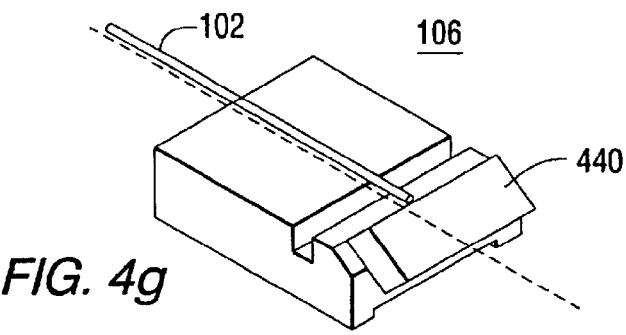
Figure 4H:
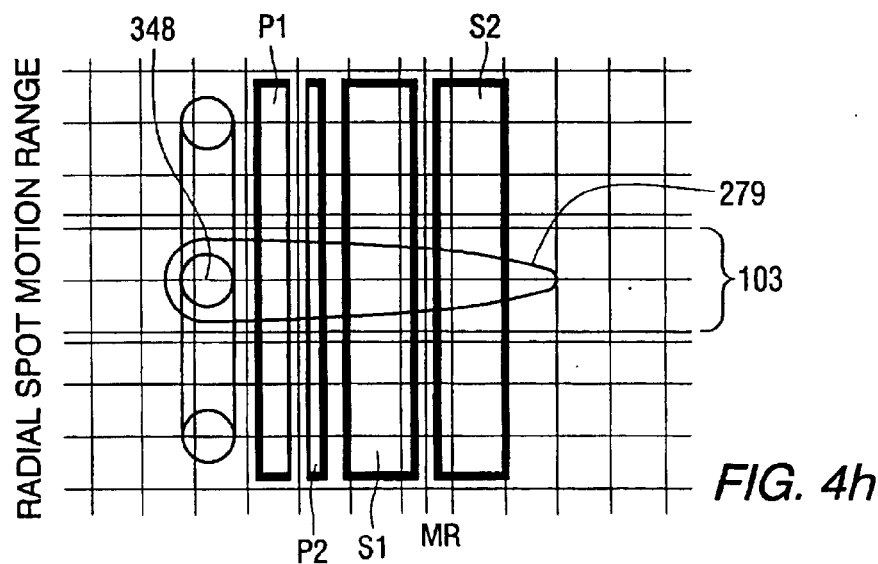
Figure 4I:
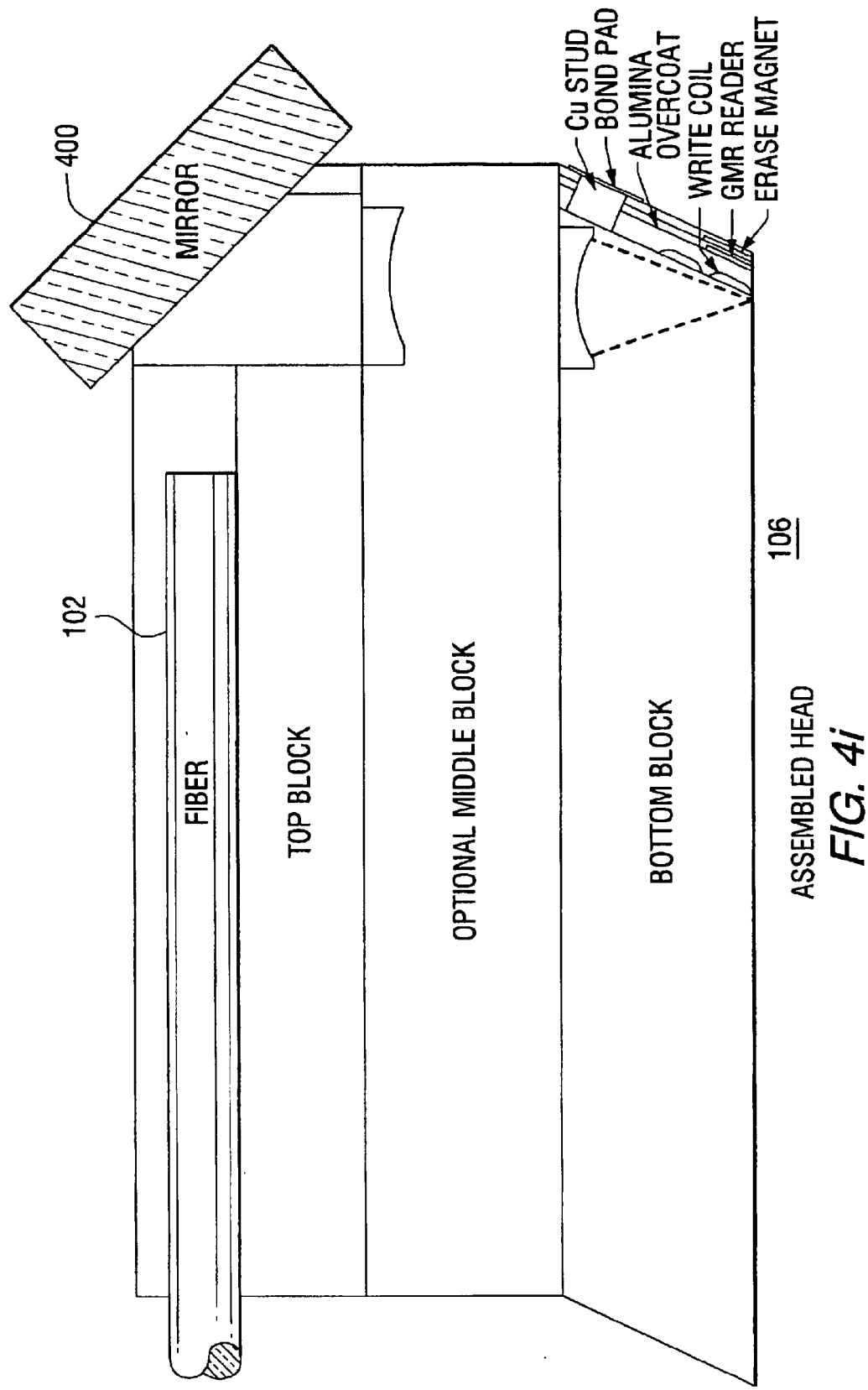
Figure 4J:
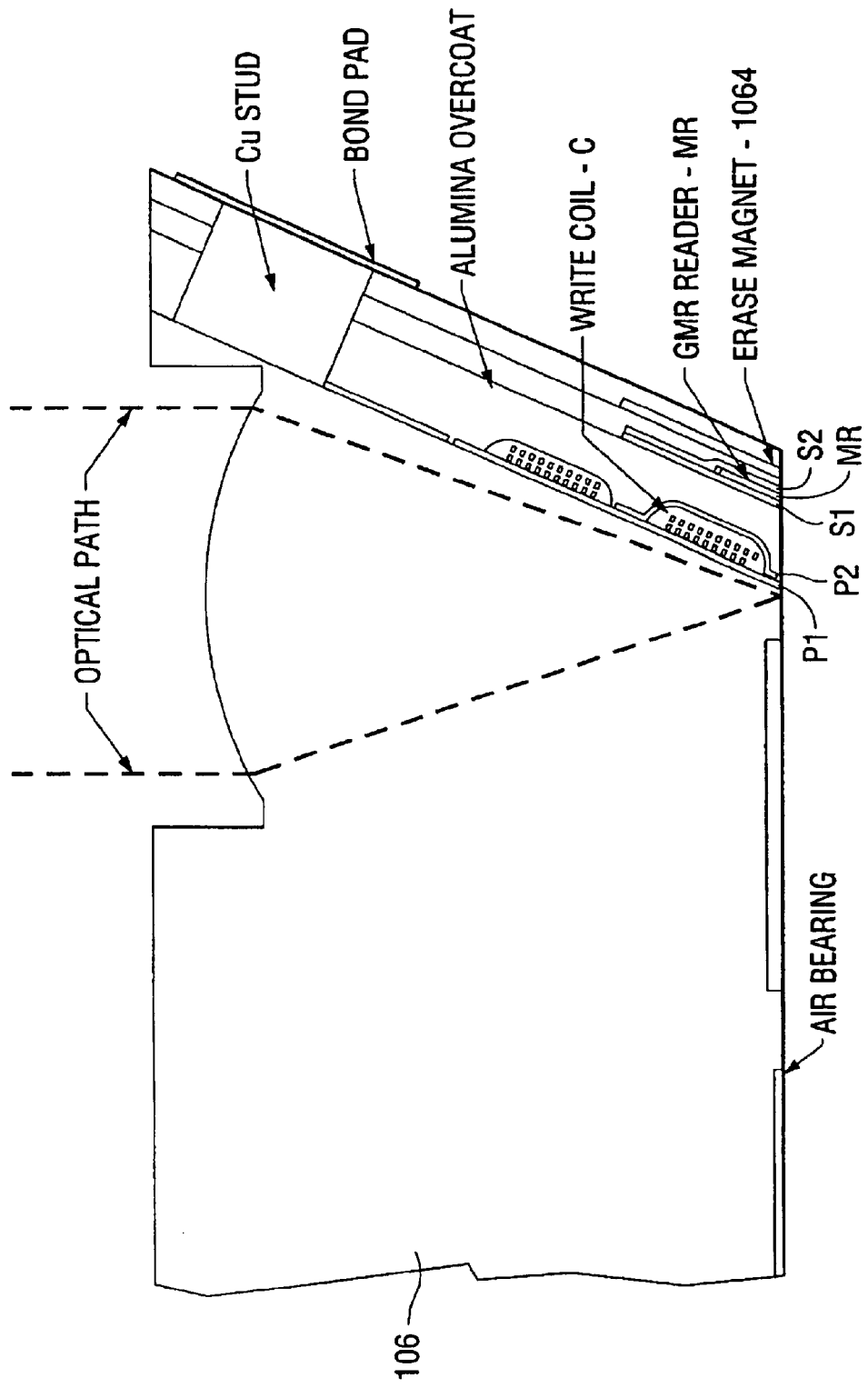
Figure 4K:
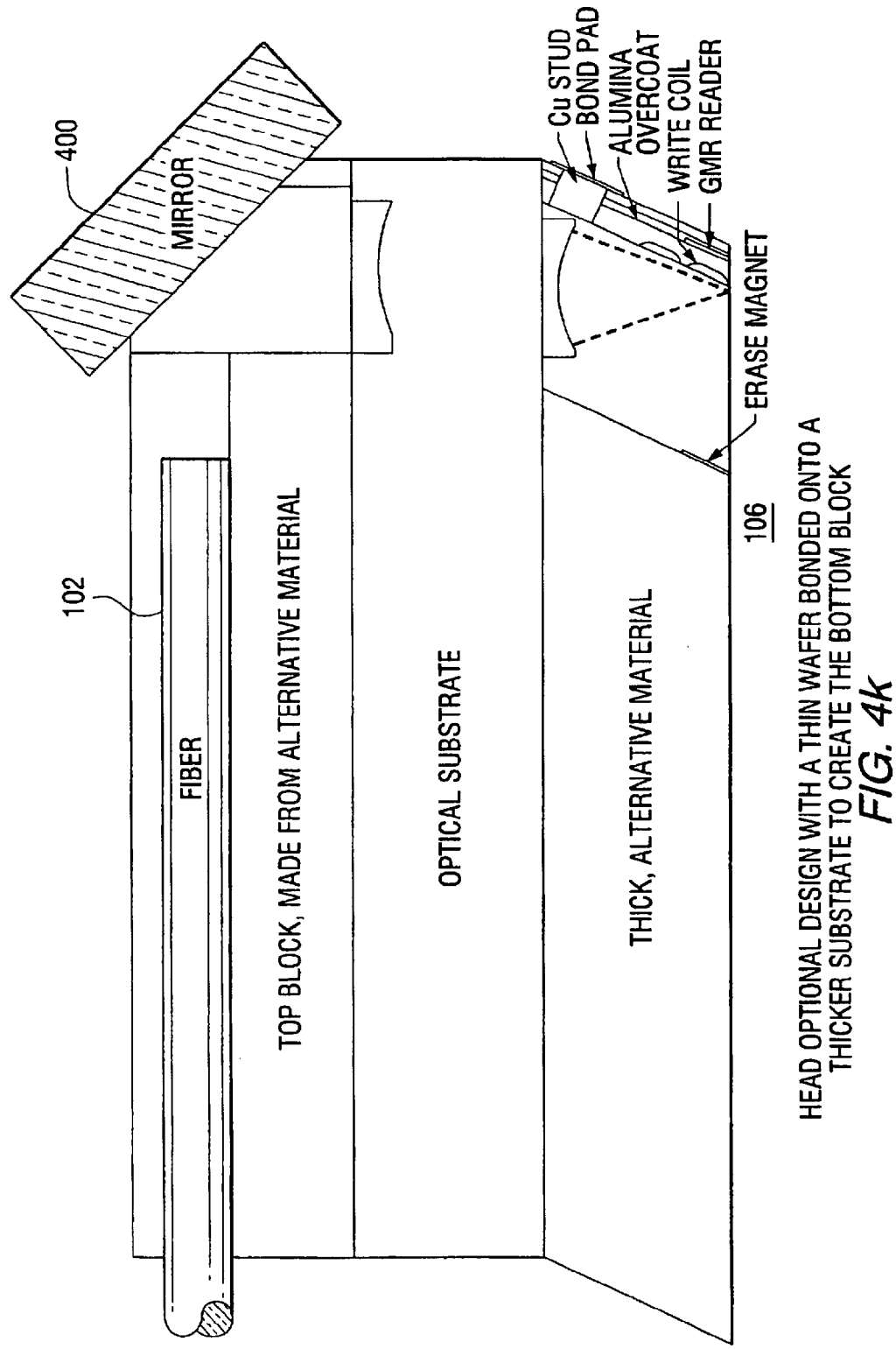
Figure 4M:
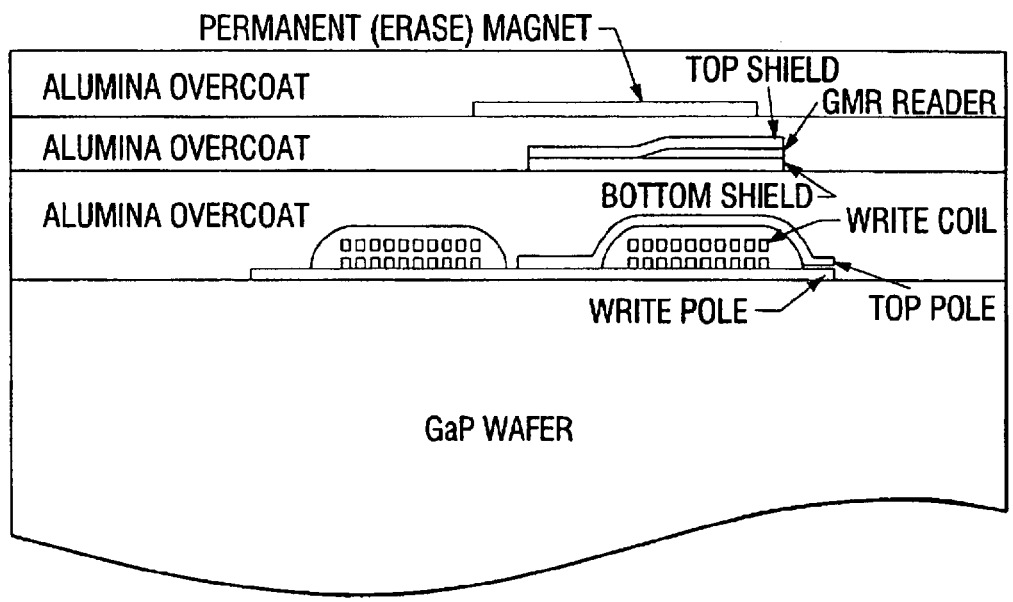
Figure 4M:
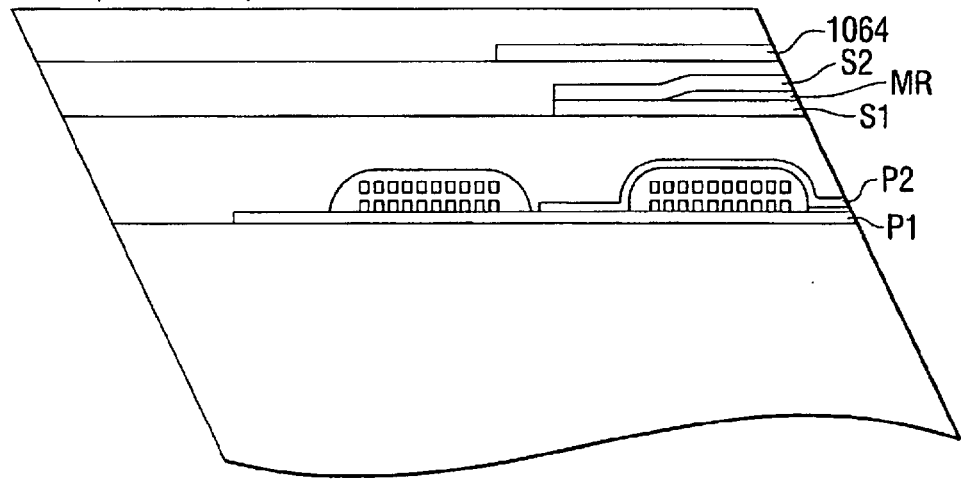
Figure 4N:
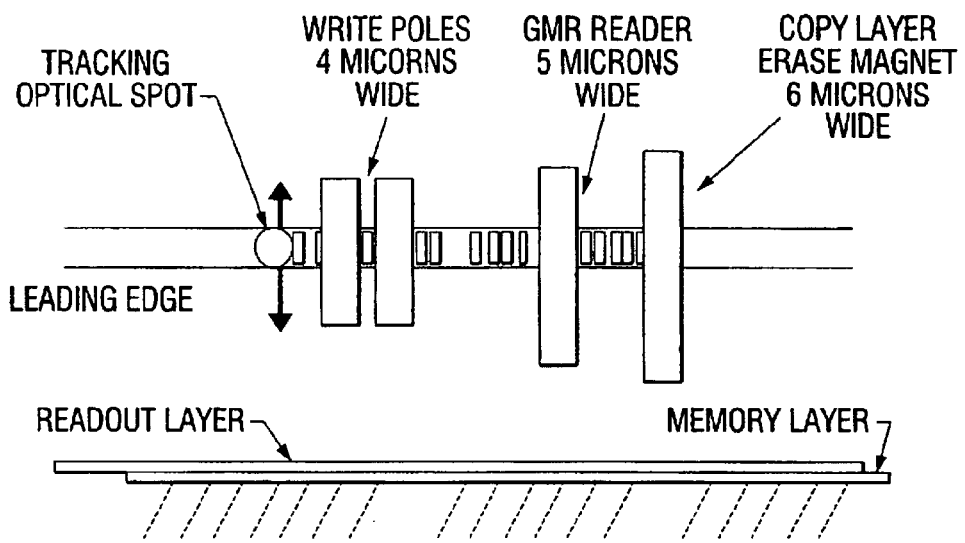

Referring now to FIGS. 4a–n, various views of a head of the present invention are seen. In FIGS. 4a–g the flying head 106 is shown for use above a recording/storage layer 355 of one of the set of disks 107. The flying head 106 includes: a slider body 444, an air bearing surface 447, a reflective substrate 400, and objective optics 446. The slider body 444 is dimensioned to accommodate the working distances between the objective optics 446, the optical fiber 102, and the reflective substrate 400. The reflective substrate 400 may include a reflective surface, which is aligned so as to direct the laser beams 191, 192 to and from the disk 107 and, for example, for fine tracking purposes. In one embodiment, the reflective substrate may comprise a micro-machined mirror as is described in commonly assigned U.S. patent application Ser. No. 08/844,207, entitled "Data Storage System Having An Improved Surface Micro-Machined Mirror," which was filed on 18 Apr. 1997 and which is incorporated herein by reference. In the preferred embodiment, the reflective substrate 400 includes a small (in one embodiment, less than 300 μm square) steerable reflective central mirror portion 420 (illustrated in FIG. 4a by dashed lines representative of the reflective central mirror portion on a side of the steerable micro-machined mirror assembly opposite to that which is visible). The small size and mass of the micro-machined mirror contributes to the ability to design the flying head 106 with a low mass and a low profile. As used in the present invention, fine tracking and short seeks to a series of nearby tracks may be performed by rotating the steerable reflective central mirror portion 420 about a rotation axis so that the propagation angle of the outgoing laser beam 191 and the reflected laser beam 192 is changed before transmission to the objective optics 446. As cross track data track densities increase, it is understood that a hi-bandwidth low mass means of fine tracking, as provided by the micro-machined mirror, would be useful. The reflective central mirror portion 420 is rotated by applying a differential voltage to a set of drive electrodes 404, 405. The differential voltage on the electrodes creates an electrostatic force that rotates the reflective central mirror portion 420 about a set of axial hinges 410 to move the focused optical spot 348 in a radial direction 450 of the disk 107. In an exemplary embodiment, a rotation of approximately ±2 degrees (equivalent to approximately ±4 tracks) of the steerable reflective central mirror portion 420 is used for movement of the focused optical spot 348 for storage and reading of information, track following, and seeks from one data track to another data track. In other embodiments, other ranges of rotation of the steerable reflective central mirror portion 420 are possible. Coarse tracking may be maintained by adjusting a current to the rotary actuator magnet and coil assembly 120 (FIG. 1). In the prior art, conventional multiple platter Winchester magnetic disk drives use a set of respective suspensions and actuator arms that move in tandem as one integral unit. Because each flying magnetic head of such an integral unit is fixed relative to another flying magnetic head, during track following of a particular magnetic disk surface simultaneous track following of another magnetic disk surface is not possible. In contrast, in one embodiment of the present invention, irrespective of the movement of the set of actuator arms 105 and set of suspensions 130, a set of the steerable micro-machine mirror assemblies of the present invention may be used to operate independently and thus permit track following and seeks so as to read and/or write information using more than one disk surface at any given time. Independent track following and seeks using a set of concurrently operating steerable micro-machined assemblies 400 would preferably require a set of separate respective fine tracking and mirror driving electronics.

Although slider body 444 may include industry standard "mini", "nano", or "pico" sliders, alternatively dimensioned slider bodies 444 may also be used.

The optical fiber 102 is coupled to the slider body 444 along an axial cutout 443, and the objective optics 446 is coupled to the slider body 444 along a vertical corner cutout 411. The cutouts 443 and 411 may be designed as channels, v-grooves, or any other suitable alignment features, or means for coupling and aligning the optical fiber 102 and objective optics 446 to the flying head 106. The laser beams 191 and 192 traverse an optical path (to and from the disk 107) that includes: the fiber 102, the reflective substrate 400, and the objective optics 446. The optical fiber 102 and the objective optics 446 are positioned to focus of the outgoing laser beam 191 within the spot of interest as a focused optical spot 348. The optical fiber 102 and the objective optics 446 may be subsequently secured in place by using ultraviolet curing epoxy or similar adhesive. Although the optical elements comprising the optical fiber 102, the objective optics 446, and the reflective substrate 400 are illustrated to be aligned along an optical path offset from a longitudinal central axis of the flying head 106, it is understood that in other embodiments these optical elements could be aligned along some other optical path, for instance, along the longitudinal central axis, as illustrated in FIG. 4g.

Referring now to FIGS. 4h–n, additional elements comprising the head of the present invention are seen in a top and side cross-section. In a preferred embodiment of the present invention, the flying head 106 may further include a conductor-C element-C, a shield element-S1, a shield element-S2, and magnetic elements, including: a permalloy pole piece-P1, a permalloy pole piece-P2, a magnetoresistive element-MR, and a pre/erase magnet 1064. In the preferred embodiment, the element MR comprises a class of magneto resistive elements which may be made to provide more sensitivity than conventional magneto-resistive elements and that is capable of reading more narrow data domains marks, and thus, narrow data track pitches, for example, a Giant Magnetoresistive (GMR) element. GMR head technology, is well known in the art and is described in, for example, "Giant Magnetoresistance: A Primer" by Robert White, IEEE Transactions on Magnetics, Vol. 28, No. 5, September 1992, incorporated herein by reference. Although in an exemplary embodiment the element MR comprises GMR technology, it is understood that the present invention is not to be limited by this embodiment as other types of elements are within the scope of the present invention, for example, Spin Valve elements and the like.

In the preferred embodiment, data is written by directing magnetic flux generated by conductor C, and read using elements S1, MR, S2. In an exemplary embodiment, the elements comprise a 1um thickness suitably positioned so as to extend over a lateral temperature profile 279 formed in a recording/storage layer 355 by the spot 348 and a 8 $\mu$m width to allow for reading and writing by the elements as the optical spot 348 is scanned back and forth by the reflective substrate 400.

In achieving the reading of narrow data track pitches the present invention addresses a number of problems. A first problem is that when data tracks are placed close together, a very high servo tracking error rejection should be implemented for data tracking; for example, a track pitch of 1 $\mu$m may require a cross-over frequency of greater than 2 kHz. In the present invention, this concern is addressed by utilizing the fine tracking capabilities of the micro-machined mirror, which was described in an embodiment of the reflective substrate 400 above, such that high speed fine tracking can be achieved with an improvement on the order of at least 10x over the prior art.

Secondly, the writing of the radial and circumferential position servo patterns (servo riting) requires accurate placement despite disk flutter and spindle bearing non-repeatable unout. One can expect a servo writing accuracy of about 0.2 $\mu$m with 0.8 mm thick 3.5-inch disks. In the present invention, this concern is addressed with reference to the description of the pits 215 above, such that near perfect patterns of servo patterns may be achieved with accuracy down to at least 5 nm.

A third problem is that writing of data may cause side-erasure of data tracks on the order of about 0.3 $\mu$m. Side erasure is preferred for proper operation of the record/playback process to eliminate old information. However, the side erasure scales within the gap width of the write elements, and the gap width is determined by the desired magnetic data domain density, which is preferably as high as possible.

Finally, head design presents problems associated with tolerancing. The photolithographic tolerance in manufacturing magnetic head elements is about ten percent of the thickness of the elements. If the head elements are about 4 $\mu$m thick; the tolerances would be about 0.4 $\mu$m.

The last two problems from above are addressed by the present invention as described below.

Figure 5A:
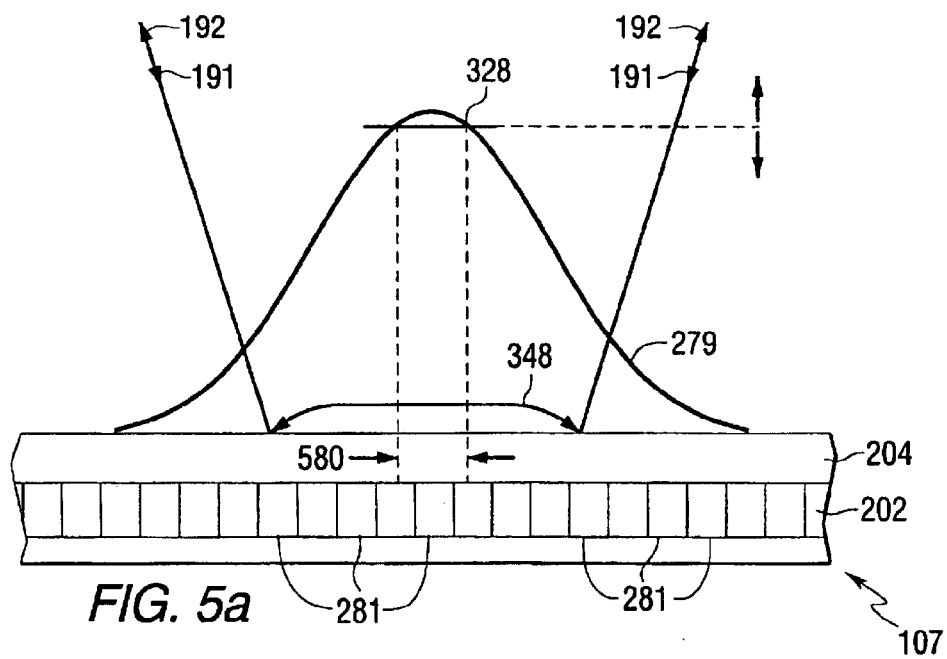
In FIGS. 5a–c, views of storage and readout layers of the present invention are seen.
Figure 5B:
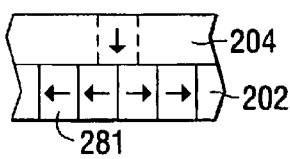
Figure 5C:
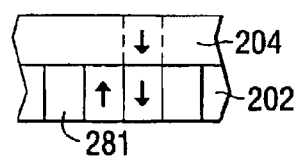

Referring now to FIGS. 5a–c, views of storage and readout layers of the present invention are seen. The following description summarizes how the outgoing laser beam 191 is used to selectively access information from the data tracks 103 comprising the data sectors 216 of the disk 107.

In the preferred embodiment, the disk 107 comprises a class of media that includes at least two magnetic layers that interact, including a storage layer 202 and a readout layer 204. An exemplary media may comprise a magneto-static media or an exchange coupled media. The storage layer 202 is preferably of a high coercivity material that supports a desired data bit density. An advantage of a high coercivity storage layer is that it has potential for overcoming the superparamagnetic limit (i.e., the tendency of adjacent domains to demagnetize each other). The coercivity is preferably high enough that the magnetic domain marks in the storage layer 202 cannot be written to at temperatures below 65 C. However, by heating the storage layer 202 with the outgoing laser beam 191, the coercivity of the storage layer 202 is preferably lowered enough such that bits can be written to a storage location comprising magnetic domains (hereinafter referred to as a data domain mark/s 281), in the storage layer 202 by the elements P1, P2, C. It is understood that in an embodiment in which the storage layer 202 exhibits a horizontal anisotropy (e.g. CoCr), the P1, P2, C elements will orient the data domain marks 281 longitudinally with an in plane orientation (FIG. 5b), whereas in an embodiment in which the storage layer 202 comprises a material that exhibits a vertical anisotropy (e.g. TbFeCo) the data domain marks 281 will be oriented vertically with an out of plane orientation (FIG. 5c).

In the preferred embodiment, the readout layer 204 may comprise a class of media that exhibits a temperature dependence that is a function of its magneto-crystalline anisotropy. The layer 204 is also responsive to heat, however, the readout layer 204 is responsive in a different way than the storage layer 202.

In one embodiment, the readout layer 204, is magnetized such that flux emanating from the data domain marks 281 in the underlying storage layer 202 cannot be read when not heated, for example, as described by K. Aratani, et al, Proc SPIE 1499, 209 (1991), which is incorporated herein by reference. In this embodiment, to read the data domain marks 281, the readout layer 204 is heated by the outgoing laser beam 191 to a lower temperature than the storage layer 202 is heated for writing. In doing so, a temperature profile 279 is formed in the readout layer 204 by the outgoing laser beam 191 as the disk 107 rotates. In this embodiment, at a particular temperature along the temperature profile 279 an aperture 580 is created in the readout layer 204, wherethrough flux emanating from the data domain marks 281 beneath the aperture is coupled to vertically align a region of magnetic domains in readout layer 204 above and such that the magnetic domain marks in the readout layer 204 can subsequently be detected by head 106 elements S1, MR, S2. The thermal time constant of the readout layer 204 should preferably be long so that the heat generated by the optical spot 348 will not dissipate by the time the head elements MR, S1, S2 pass over the spot. In this embodiment, the flux from the data domain marks 281 is understood to be accessible only during the time at which the outgoing laser beam 191 is applied to form the aperture. Preferably, the aperture will be preferably smaller that the spot 348 diameter and the outgoing laser beam 191 will, thus, not limit the resolution in the track direction, but will define the readout resolution in a cross data track 103 direction (radially).

In another embodiment, the media 107 comprises a storage readout layer 204 that may function in a manner that when heated by an optical spot 348 to an appropriate temperature, flux from the data domain marks 281 in the storage layer 202 below couple to align the magnetic domains in the readout layer 204 above, however, unlike in the embodiment described above, when power to the outgoing laser beam 191 is turned off, the magnetic domains in the copy layer 204 remain in an aligned orientation. In this embodiment, the pre/erase magnet 1064 may be positioned on a trailing edge of the head 106 for subsequent realignment/erasure of the magnetic domains in the copy layer 204. In an exemplary embodiment, the pre/erase magnet 1064 comprises a rare earth material such as to provide sufficient magnetic field strength for the realignment/erasure. In other embodiments, it is understood that the pre/erase magnet 1064 could also be located on a leading edge of the head elements 106 or on or off the head 106. Because the magnetic domains remain oriented in the readout layer 204 until erased, it can be understood that in this embodiment, the thermal aperture 580 described above does not need to be relied upon for readout. The room temperature coercivity of the read layer 204 is chosen so as not to affect the storage layer 202 but so it can be erased by the pre/erase magnet 1064. In this alternative embodiment, because the magnetic domains in the readout layer 204 remain aligned until erased, fabrication of the head elements S1, MR, S2 is made easier since the elements do not need to be situated close to the optics 446.

In yet another embodiment, the media 107 may comprise a single layer of amorphous magnetic material . In this embodiment, a relatively thick (~100 nm) single layer of a suitable rare earth-transition metal (RE-TM) can be tailored for both laser-assisted thermomagnetic writing and readout by the elements comprising the head 106. A composition of the ferrimagnetic RE-TM film is chosen such that the compensation temperature is near room temperature, providing high coercivity for safe storage of the media 107 and diminished coercivity at elevated temperature to enable writing. This same design will have near-zero remanent magnetization (and no read signal) near room temperature, and sufficient magnetization for selective readout of the data track (with little adjacent track crosstalk) at the moderately elevated temperature of the reading beam. Such a media is described by Katayama et al., in an article entitled "New Magnetic Recording Media Using Laser Assisted Read/Write Technologies," presented in paper 13-B-05 at MORIS-Magneto-Optical Recording International Symposium '99, on Jan. 10–13, 1999 at Monterey, Calif. USA, which is incorporated herein by reference.

In summary, the outgoing laser beam 191 and the reflected laser beam 192 are used as part of an optical servo system to keep the flying head 106 centered over a particular data track. Unlike prior art optical drives, the outgoing laser beam 191 is used to heat the storage and readout layers 202, 204. The readout layer, when heated to a lower temperature than the writing temperature, copies data domain marks 281 from the storage layer 202 to the readout layer 204 such that the flying head 106 can sense the orientation of the magnetic domains within the aperture 580. Although the dimension of the elements comprising the head 106 are wider than the data track 103 pitch, the temperature profile formed by the outgoing laser beam 191 will preferably define the edges of the written data domain marks 281 (in the cross track direction). Thus, it is possible to read the data domain marks 281 more narrowly than they can be written, increasing the in track storage density of the system 100.

In practice, however, it may be possible that the heat applied by the outgoing laser beam 191 to the layers 202, 204 may tend to diffuse during the transit time of the heated region travels under the edge of the head elements P1, P2, C, S1, MR, S2. Heat diffusion is desired such that the aperture 580 can be formed to extend far enough under the elements head elements P1, P2, C, S1, MR, S2 for reading and writing. However, because of heat diffusion, the thermal gradients that create the aperture 580 may not be steep and hence the edges of the data domain marks 281 may not be well controlled or defined. For reading of data by the head elements S1, MR, S2 the data domain marks 281 should preferably comprise straight edges and should not overlap between data tracks 103.

In general, the layers 202, 204 will have different rates of heat diffusion in vertical (axial) and lateral (in plane) directions.

To understand the lateral diffusion heating process, heating a surface of the disk 107 with the outgoing laser beam 191 may be analogized to that of pouring of a viscous fluid on a flat moving surface, wherein the height of the fluid above the surface corresponds to temperature. It can be understood from this analogy that the fluid would spread out in all directions such that the isoclines of a lateral temperature profile of constant height would look like an expanding teardrop. An exemplary lateral temperature profile 279 formed by the outgoing laser beam 191 was illustrated in FIG. 4h.

To understand the vertical diffusion process, the temperature profile 279 as shown in FIG. 5a, the disk 107 can be analogized as a screen through which the fluid can flow. The vertical flow causes the gradients (rate of change of fluid height) to be more steep. When the vertical flow is high, adjacent data tracks 103 on the disk 107 would see little heat, which is analogous to the fluid height. Thus, if one cannot adjust the vertical to lateral diffusion ratio, adjacent data tracks 103 may be over-written and/or irregularly shaped data domain marks 281 marks may be formed. One would, thus, like to control the formation of the data domain marks 281 for proper reading by the elements S1, MR, S2.

The present invention identifies that by providing channels or mesas 266 between data tracks 103 of the disk 107, undesired effects of the aforementioned vertical and lateral heat diffusion can be minimized and/or controlled by blocking and/or directing thermal conduction between data tracks 103 of the disk 107 to thereby provide improved writing and reading by the head 106 elements. Use of channels or mesas 266 will be discussed below, but first a further discussion of the pits 215 is provided.

Referring now to FIGS. 6a–d, steps for the formation of a pattern of raised and depressed features and the subsequent transfer of the features to the substrate 245 of the disk 107 is seen. The steps may include: the use of conventional injection molding technology to make a plastic substrate of a material such as polycarbonate or alternate techniques such as the embossing of a relatively thin polymer layer on a substrate of polished glass or aluminum. Alternatively, features may be defined by applying a photo sensitive mask layer on a substrate such as glass or aluminum, photo lithographically defining the desired regions and the photo sensitive layer, and etching the substrate by means such as reactive ion etching or ion milling followed by removal of the photo sensitive layer. A further alternative would be applying a photo sensitive layer of a desired thickness to a substrate material, and defining the pits directly in the photo sensitive layer by means of a photo lithographic step. Other approaches to defining a pit pattern in the substrate of other types of drives, including magneto optical, optical, or magnetic can be defined, or have already been defined and do not comprise a restraint on or a part of this invention.

For all the techniques described above and other similar techniques, except for differential etching into a glass substrate, the features may be defined in a relatively soft substrate, typically either plastic or aluminum or equivalent, for example, as in an embodiment utilizing pits 215. For the later differential removal step, of which the example to be discussed is chemical mechanical polishing (CMP), a relatively hard and polish resistant layer is needed over the substrate in order to define as nearly as possible the finished elevation of the disk being prepared.

Figure 6A:
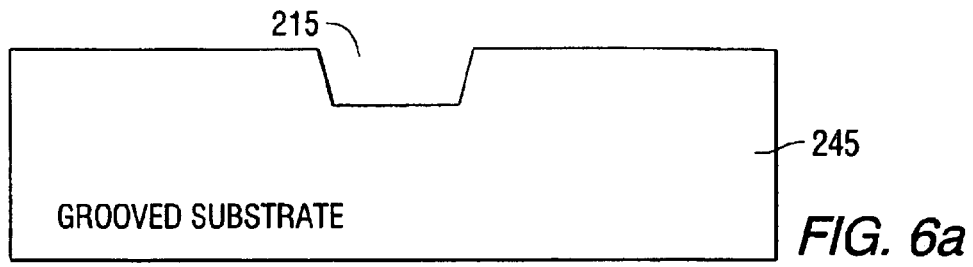
In FIGS. 6a–d, steps for the formation of a servo pattern is seen.
Figure 6B:
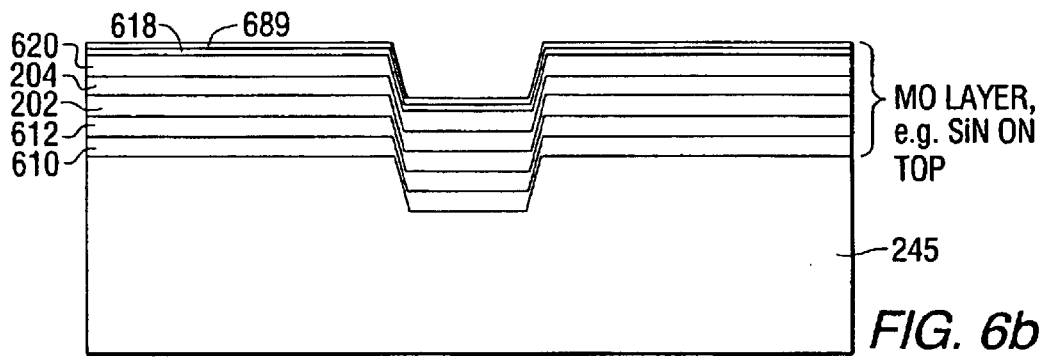

For example, in FIGS. 6a–6d in the disk 107 of the present invention, a sequence of layers to control thermal, magnetic, and optical performance of the recording layer may be used. Such layers in a typical first surface design may include: a lower thermal spreader layer 610, for example, such as aluminum; a bottom dielectric layer 612, the storage layer 202; the readout layer 204; and a top dielectric layer 620. In an exemplary embodiment, the thickness of each of these layers is about 50 nm. As will be discussed, the dielectric layer 620 may comprise a silicon nitride layer 699 and/or sputtered silicon dioxide layer 618 which are both relatively polish resistance and thus can potentially function as a hard layer to the differential removal process. The cross-section after this step is shown in FIG. 6b. Once again, it must be remembered that this is just an exemplary sequence of layers and that the present invention is not limited to use with such a sequence of layers, but rather can be easily adapted for use with other magneto optical, optical, or magnetic recording disks. For example, a silicon nitride layer (not shown) may be used between the substrate 245 and the thermal spreader layer 610 in an embodiment where the substrate is relatively soft.

In a conventional embossing process for optical data storage disks, the depth of each pit is typically about ¼ wavelength of, for example, red light, or about 160 nm deep. With conventional pits, therefore, variations in the pit depth tolerances may result in variations in a detected reflection signal. In contrast, in the present invention, the signal 149 (FIG. 1) derived from the pits 215 may be a function of the reflectivity of a filler material and not the relatively tight tolerances required for the pit depth in the prior art.

Figure 6C:
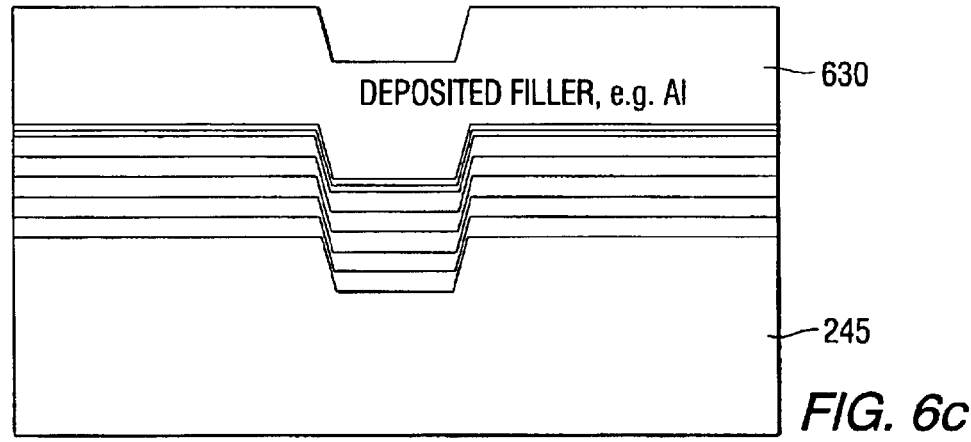

In the preferred embodiment, both the silicon dioxide layer 618 and the silicon nitride layer 699 are used. The silicon dioxide layer is used as a sacrificial layer to insure that a correct layer thickness remains at the end of the chemical polishing or other etching process described below. In the preferred embodiment, a filler material 630 is deposited, or otherwise laid down on top of the layers 610, 612, 202, 204, 618, 699. For example, one filler material 630 could be sputtered aluminum or aluminum alloy. An exemplary thickness is about twice the depth of each pit 215, for example, for a pit depth of about 160nm, the thickness of the filler material 630 is about 300 nm. The cross-section of the substrate 245 with the deposited filler material 630 is shown in FIG. 6c. In a next step, the disk 107 is subjected to a differential removal process which, removes the filler material 630 but is stopped or substantially stopped by the harder silicon dioxide layer 618. A useful process is polishing with a CMP process developed for the IC industry such as described in a paper by WANG et al., "Chemical-Mechanical Polishing Of Dual Damascene Aluminum Interconnects Structures", Semiconductor International, 1/95. This process uses commercially available equipment and materials to provide polishing selectivity of about 100 between the filler material 630 and the silicon dioxide layer 618. Thus, in this particular example, in polishing all 300 nm of the filler material and with 50% over polishing, less than 2 nm of the sacrificial silicon dioxide layer 618 is preferably removed. The resulting surface is substantially flat, but now, with filler material 630 filling the pits 215. The silicon dioxide layer 618 is next etched with a wet chemical etchant, which preferably does not appreciably etch the underlying silicon nitride layer 699.

Figure 6D:
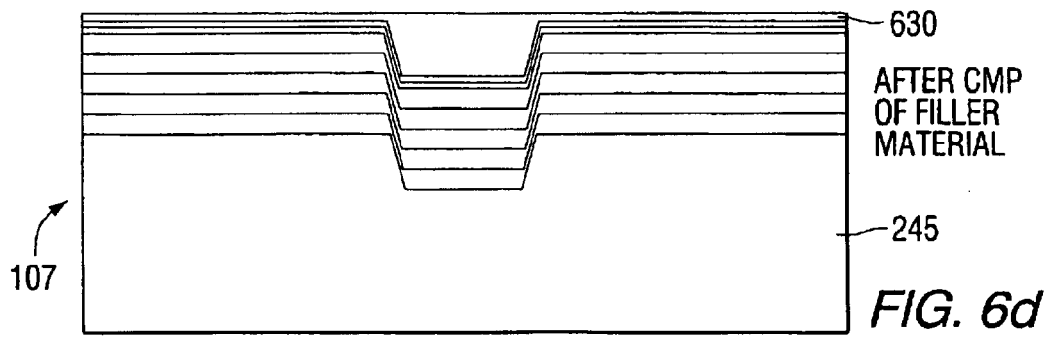

Preferably, after these last steps, the surface of the disk 107, as shown in FIG. 6d, should have a maximum height disturbance approximately the same as the thickness of the layer 620 (perhaps 10–15 nm) or in an exemplary embodiment, about a factor of 10 less than the prior art. Thus, in contrast to the prior art, the disk 107 of the present invention presents a surface to the flying head 106 that is disturbance free, which allows the head to fly stable and/or with a reduced flying height, which those skilled in the art will recognize as being beneficial for near field type optical data storage applications as well as the flying head 106 of the present invention. Because the pits 215 are now filled with reflective material, the reflected signal 192 will have a larger amplitude over that of the prior art diffraction servo tracking method, for example, in an exemplary. embodiment, 3 times larger. Furthermore, the pits 215 of the present invention do not present cavities subject to contamination from sources such as particulate matter from the disk 107 itself, for example, disk lubricant, deposition of which would degrade the signal 149 over time.

In a further improvement, if a small reduction in the silicon nitride layer 699 thickness can be tolerated, then no sacrificial dioxide layer 618 would be needed, and the top surface would be even more flat and smooth.

Figure 7A:
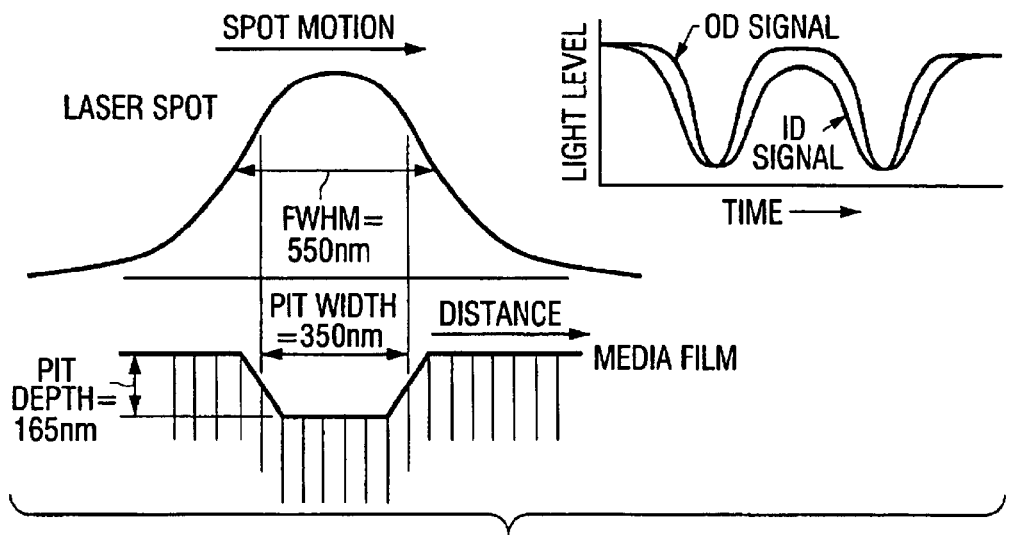
In FIGS. 7a–b, signals derived from depressed features are seen.

Referring now to FIG. 7a, there is seen a signal derived from pits comprising a constant radius. As described previously, the servo sector 212 of the present invention may or may not utilize an automatic gain control field (AGC). If an AGC field is not used and if the pits are of constant size over the radii of a corresponding disk, a signal derived from the pits may vary because of the slower velocity at an inner radius vs. an outer radius of the disk. FIG. 7a illustrates a representative unfilled pit and a representative servo signal derived therefrom at both an outer radius and an inner radius of a corresponding disk. It is seen that the pulse width of the signal may vary, a characteristic which may affect the accurate positioning of a head over the disk.

Figure 7B:
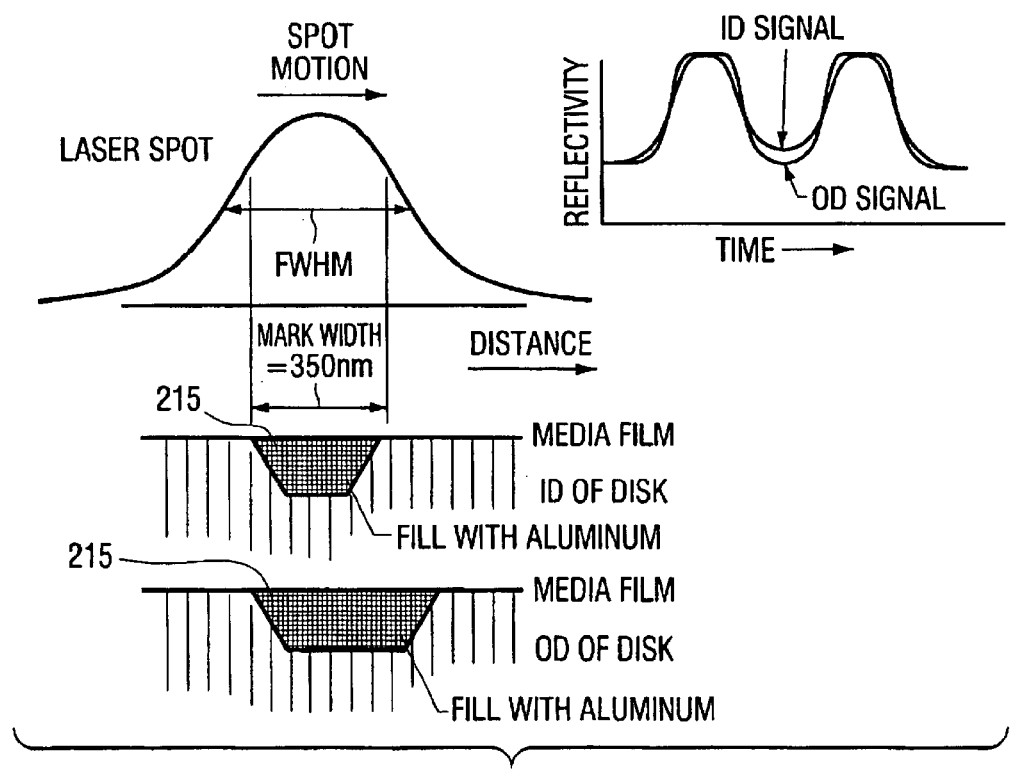

Referring now to FIG. 7b, signals derived from pits comprising a non-constant radius are seen. In the preferred embodiment, the pits 215 may comprise a dimension such that the dimension is proportional to the radius of the disk 107 at which the pits 215 are disposed, for example, a dimension comprising a reflective surface area or a radius. The signal 149 derived from the pits 215 of FIG. 7b will, thus, preferably comprise a similar pulse width, irregardless of the position of the pits 215 on the disk 107. Consequently, variations in the servo signal 149 derived from the pulses from the pits 215 may be minimized. In an embodiment of the system 100 that utilizes a digital servo channel in which the pulses are sampled and integrated, a reduced sampling rate could, thus, be utilized since the pulse width obtained from the outer diameter could preferably be made to be the same as the wider pulse width obtained from the inner diameter of the disk 107. It is understood that pits that comprise a dimension that is proportional to the radius of the disk 107 at which they are disposed could also find utility in an embodiment in which they are not filled with a filler material, such as in a drive that utilizes diffraction rather than reflection from the pits.

Figure 8A:
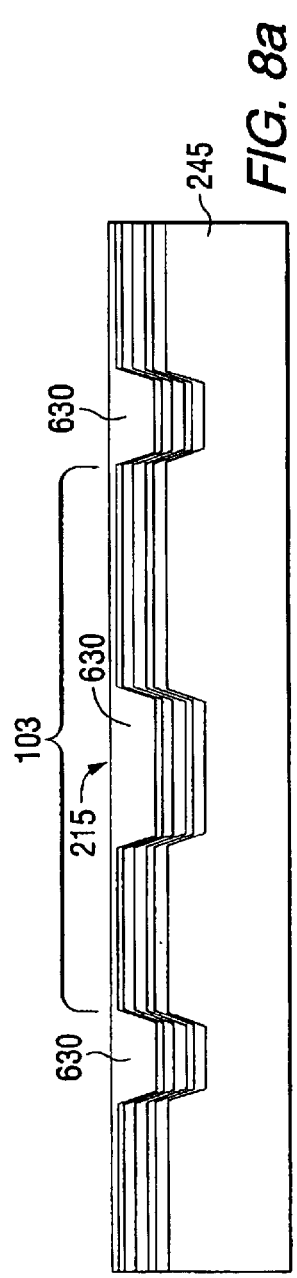
In FIG. 8a, a substrate comprising depressed and raised features is seen.

Referring now to FIG. 8a, there is seen an end on view through a substrate comprising raised and depressed features. FIG. 8a illustrates that the process for filling the pits 215 may be also be used to fill the channels 266. Thus, some of the same benefits derived from filling the pits 215 with the filler material 630 may also apply to filling the channels 266, for example the benefit of providing a flat surface for maintaining a flying head 106 over the disk 107 as well as the benefit of providing a reduction in the accumulation of contaminants.

Filled channels or mesas 266 between data tracks 103 of the disk 107 provides the present invention with further benefits. It can be seen by further analogy that highly conductive and high heat capacity filler material like aluminum or metal in a channel 266 between data tacks 103 may act like a heat sink, whereas a low conductivity and low heat capacity filler material as discussed below may act like a vertical wall between data tracks 103 to block radial heat flow.

Simulations show that highly conductive filler material 630, such as aluminum, causes the heat generated by the spot 348 to diffuse, which in turn may cause the geometry of the data domain marks 681 to lose their preferred rectangular or square shape during writing of the marks. On the other hand, a low conductive fill material may cause the data domain mark edges to be more straight and thus in an approximation, perpendicular to the channels 266 and stopping at the channels. Consequently, aluminum may not be the best choice for the filler material 630.

In an exemplary embodiment, the channels 266 between data tracks 103 comprise a relatively narrow width and an aspect ratio of more than 5 to 1, which may limit the vertical dimensions of the channels 266 to between 100 and 1000 nm. Some known type of filler materials that are reflective when deposited as thin layers and that may support these dimension and aspect ratios includes metals (i.e., the aforementioned aluminum) and certain types of dye polymers. However, as discussed above, metal acts undesirably as a heat sink. Dye polymers exhibit low conductivity and thus are usable as filler material, however, they are more difficult to polish. Because glass has low conductivity, it is another material which could be used, however, glass would be usable in an embodiment in which increased reflection is not preferred, for example, such as in an optical drive that utilizes diffraction information for servo tracking.

Figure 8B:
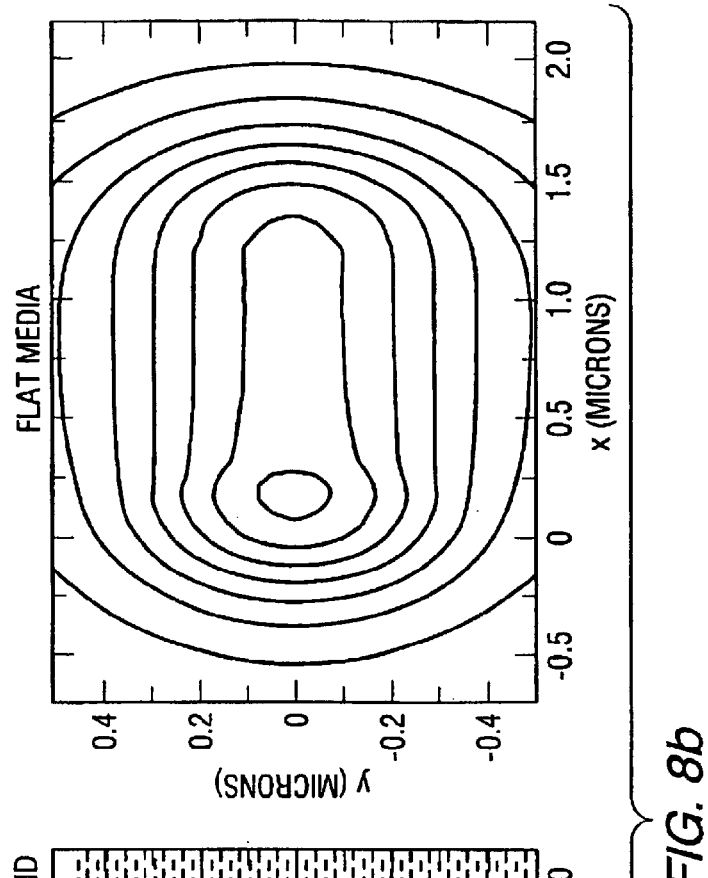
In FIGS. 8b–f, simulations of heat diffusion resulting from application of an outgoing laser beam to a media comprising no channels and channels are seen.
Figure 8B:
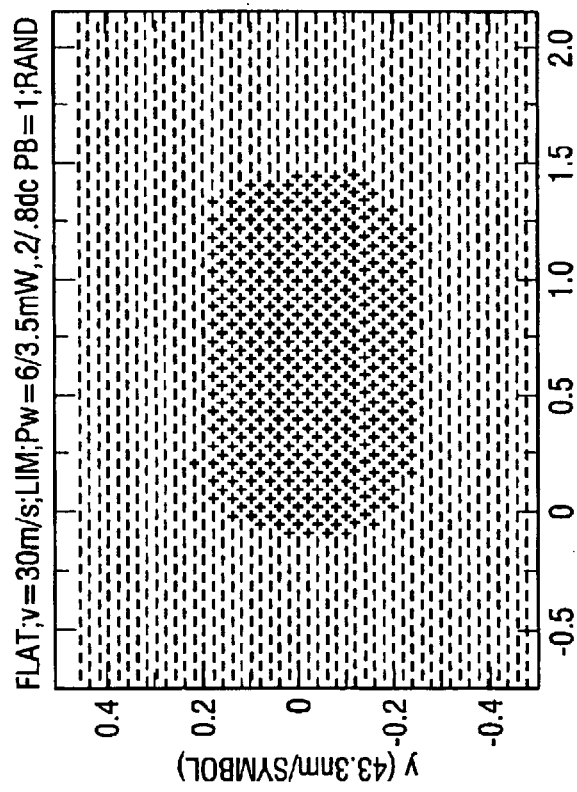
Figure 8C:
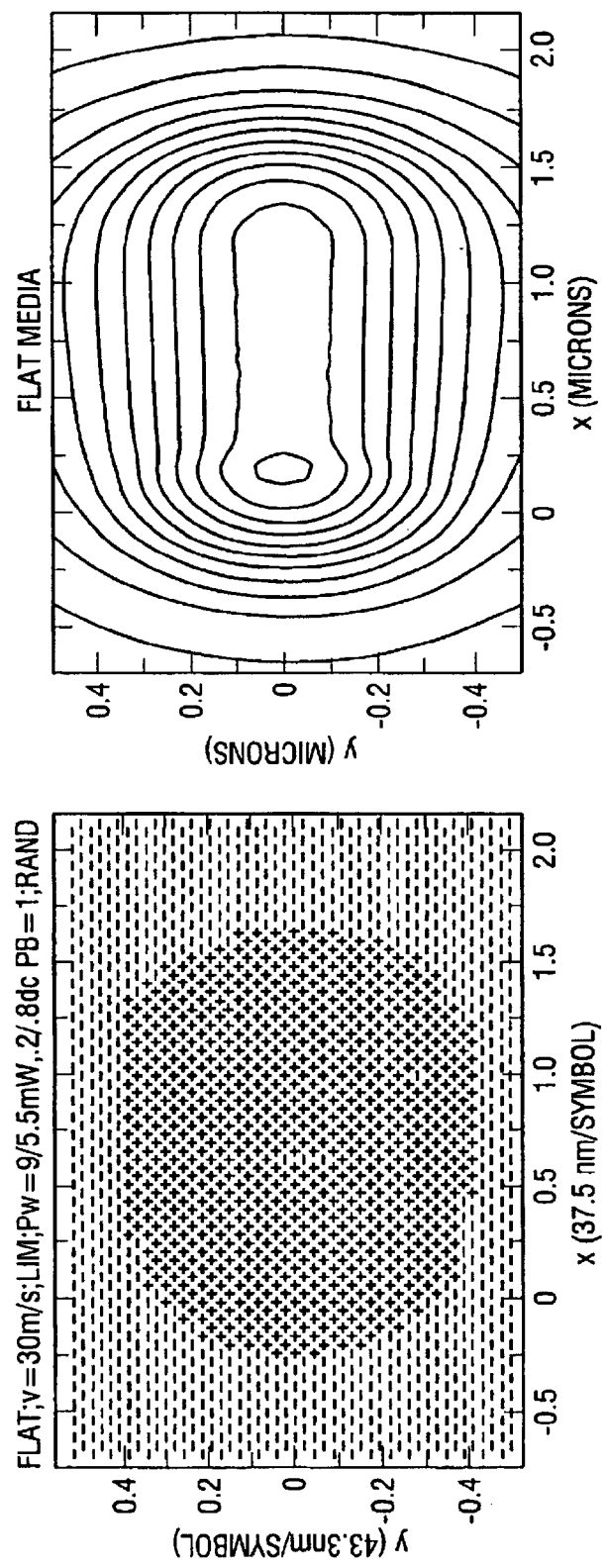
Figure 8D:
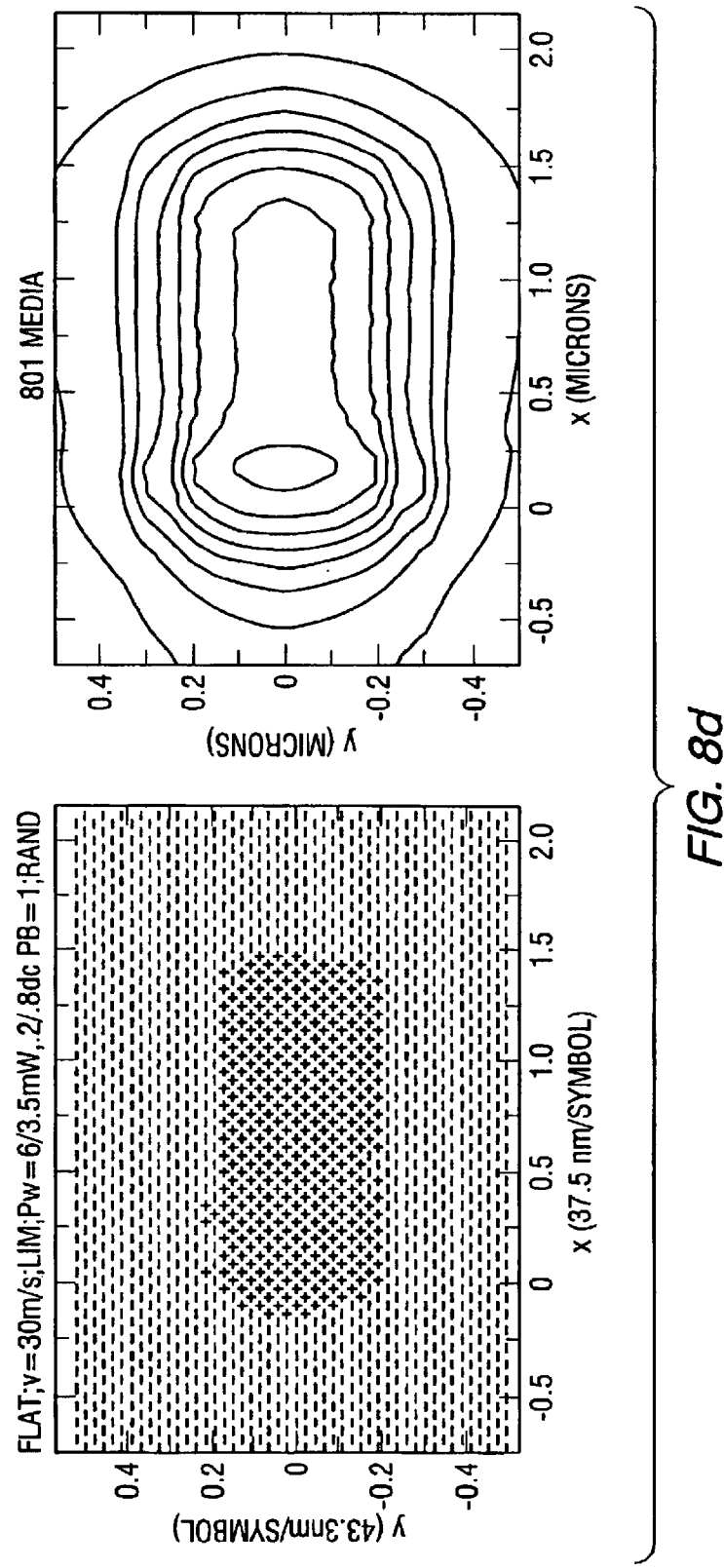
Figure 8E:
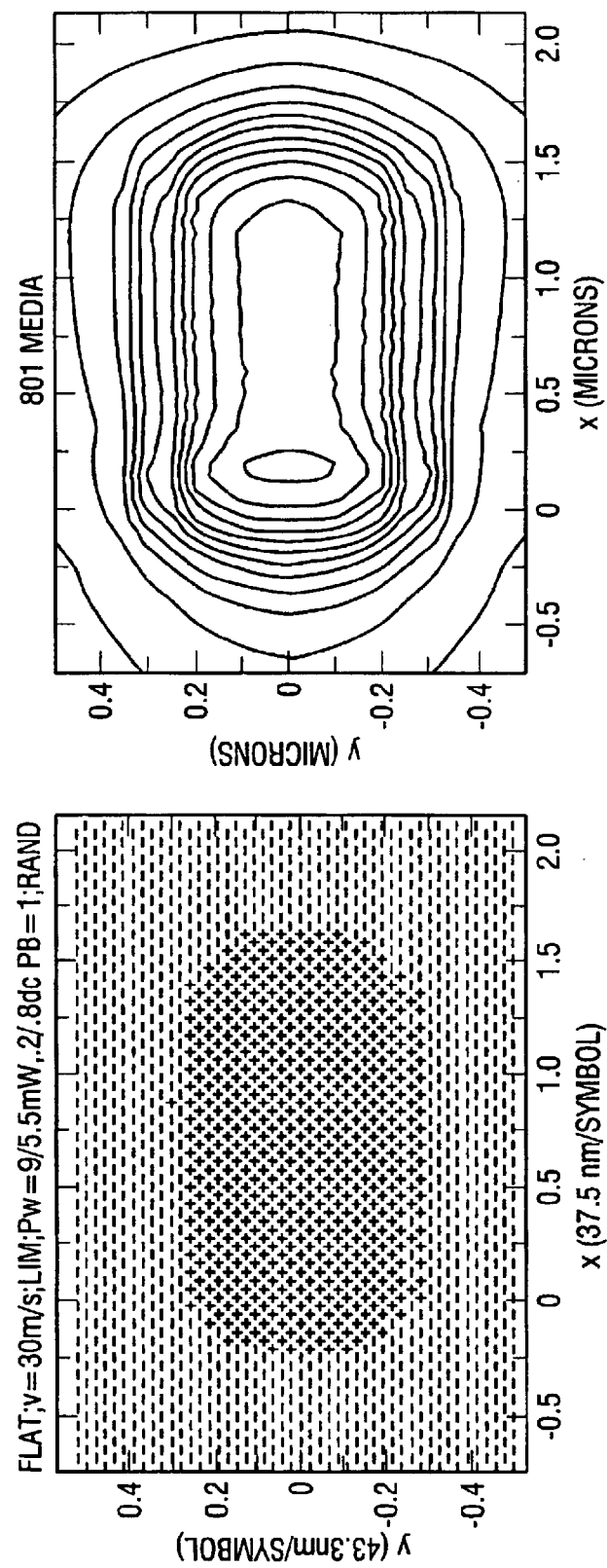
Figure 8F:
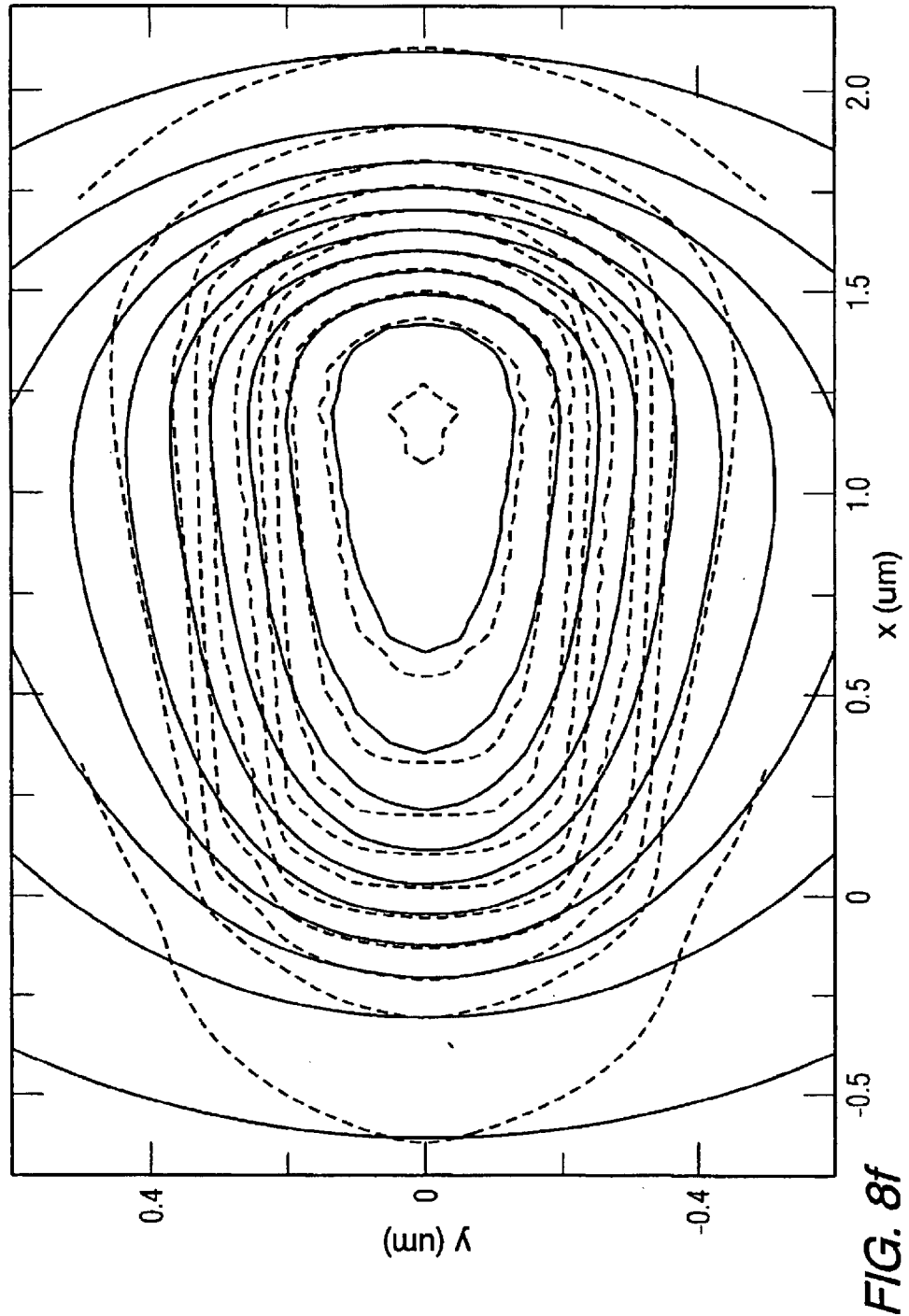

Referring now to FIGS. 8b–e, simulations of heat diffusion resulting from application of an outgoing laser beam to a media comprising no channels and channels are seen. As discussed above, application of a beam of light to a media in the prior art may result in a temperature profile that affects formation of the data domain marks 281 undesirably. FIGS. 8b–c illustrates temperature profiles of a typical aperture as would be formed in the prior art, while FIG. 8d–e illustrates temperature profiles that are formed when using a disk 107 comprising the channels 266. As seen by overlaying respective temperature profiles in FIG. 8f, the temperature gradients are steeper in a disk that comprises the channels 266 of the present invention. Consequently, the data domain marks 281 are better defined and formed in the in track and cross track directions. It is seen, therefore, that the channels 266 of the present invention act to direct and control thermal diffusion such that the data domain marks 281 will better exhibit a preferred rectangular or square geometry such that a greater flux density will be provided to the head 106 S1, MR, S2 elements during reading of data. By confining the data domain marks 281 in the cross-track direction, uniform background noise into the had element MR can be minimized during wide writing and narrow reading, which permits a higher storage data density over that of the prior art.

Referring now to FIGS. 9a–e, a disk comprising mesas and raised features is shown. FIGS. 9a–e illustrate a different approach to channel heat generated by an optical spot 348, whereby the data tracks 103 are disposed between mesas 266 rather than between channels. In this embodiment, the mesas 266 may comprise the same material as the substrate 245, for example, glass. In fabricating the mesas 266, the process may include using negative resist to reverse master a disk format to include formation of the servo sector 212 patterns as well as the mesas 266. It is understood that in this embodiment the servo sector 212 patterns may comprise raised features 215 rather than the pits.

Recall that above, the disk 107 may comprise layers of materials that are deposited in the following order: aluminum, a bottom dielectric layer, a storage layer, a readout layer, a top dielectric layer. An exemplary fabrication process for a disk 107 comprising mesas 266 may therefore comprise: mastering a glass substrate 245 so that the mesas 266 and servo patterns comprise a feature depth of between 50 and 100 nm, depositing an aluminum or permalloy (nickel and iron) layer 610 on the substrate 245 and chemically mechanically polishing the aluminum or permalloy using a surface of glass substrate 245 as an etch stop, depositing a dielectric layer, depositing a storage layer 202 and a readout layer 204, and depositing a silicon nitride 699 passivation layer.

The mesas 266 preferably act to interrupt thermal conduction of the thermally conductive aluminum layer 610 radially. Because the recording layers 202, 204 are relative thin, about 20% less thermally conductive as the under-layer, they couple thermally to aluminum layer 610. Hence, even though there may be some radial heat conduction through the recording layers 202, 204; there will be a thermal conduction discontinuity at the edge of the mesas 266 between the tracks to provide a good heat barrier.

It is expected that about 50% of the outgoing laser beam 191 will pass through the recording layers 202, 204. The outgoing laser beam 191 will either be reflected by the aluminum at the center of the track 103 or get absorbed by the substrate 245. Typically, about 20% of the incident light will be reflected at the center of the track 103 and only about 10% of the incident light will be reflected at the mesas 266. Thus, depending on requirements, a tradeoff between incident light absorption versus servo signal 149 may be required. It is understood that this difference in reflection may be used for servo tracking in an embodiment that utilizes diffraction information.

Figure 9A:
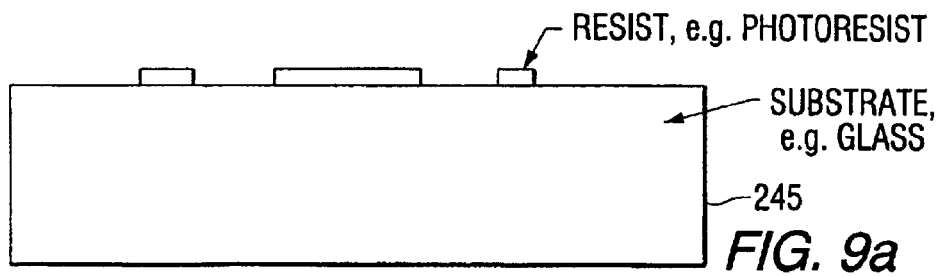
In FIGS. 9a–e, formation of a disk comprising depressions and raised features is seen.
Figure 9B:
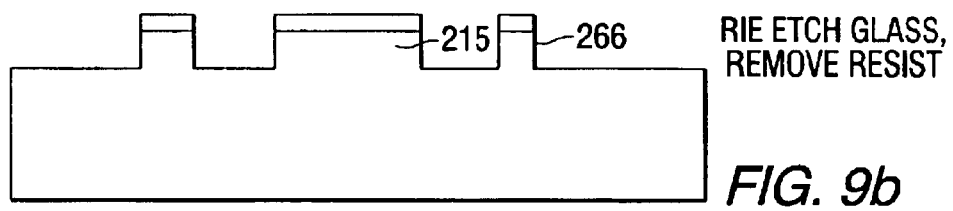
Figure 9C:
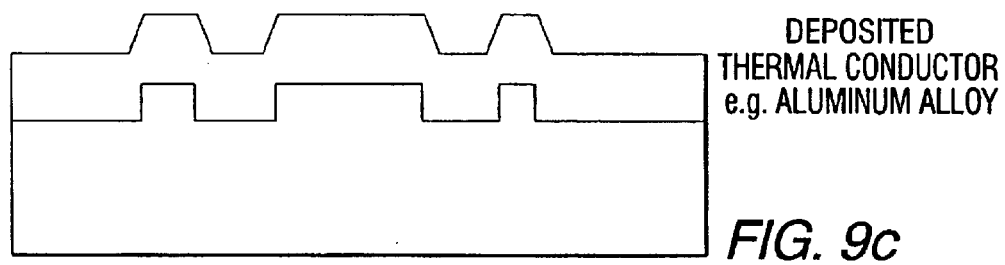
Figure 9D:
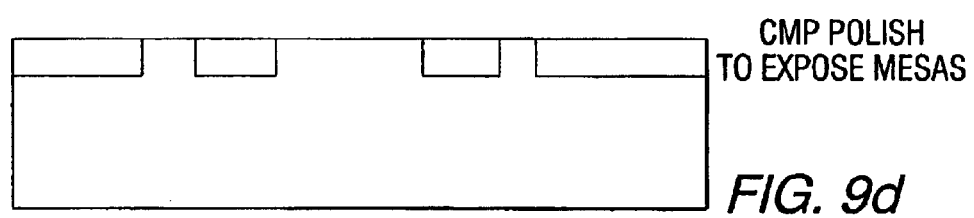
Figure 9E:
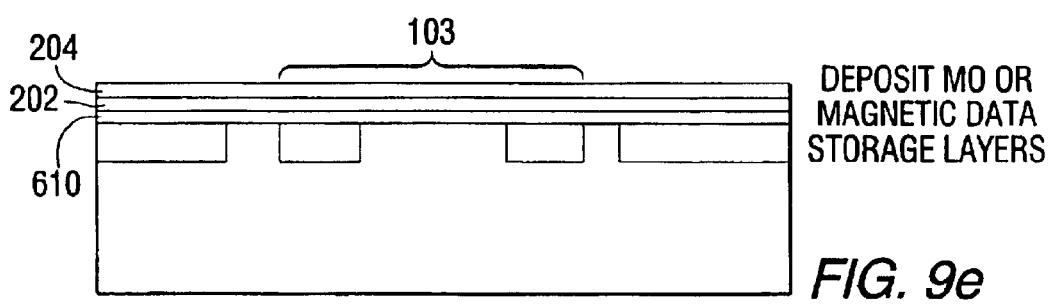
Figure 9F:
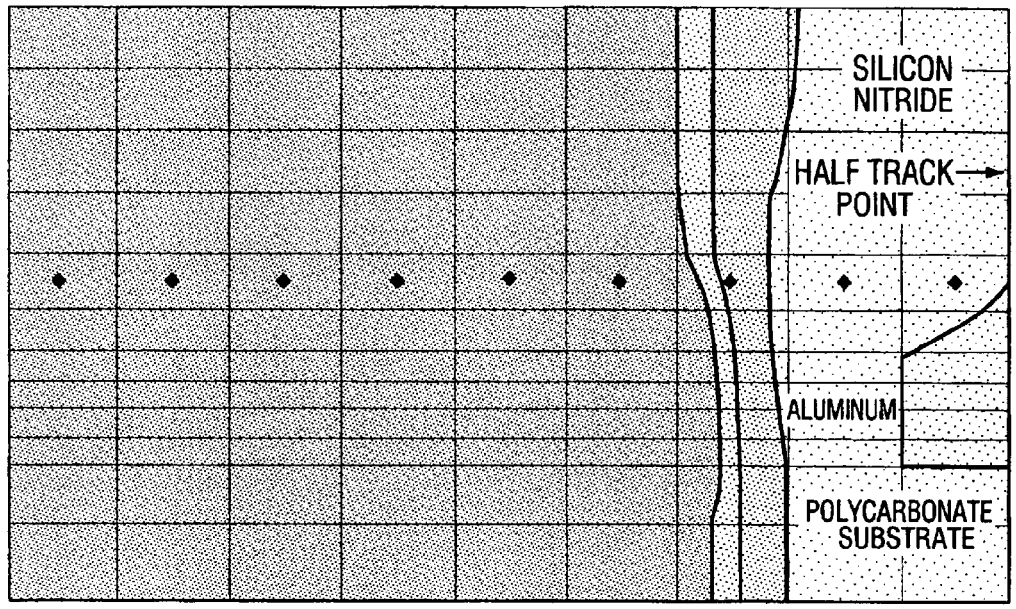
In FIGS. 9f–i, representations of temperature profiles in a disk comprising features and no features is seen; and In FIGS. 10a–b, a variation of the flying head of the present invention is seen.
Figure 9G:
Figure 9H:
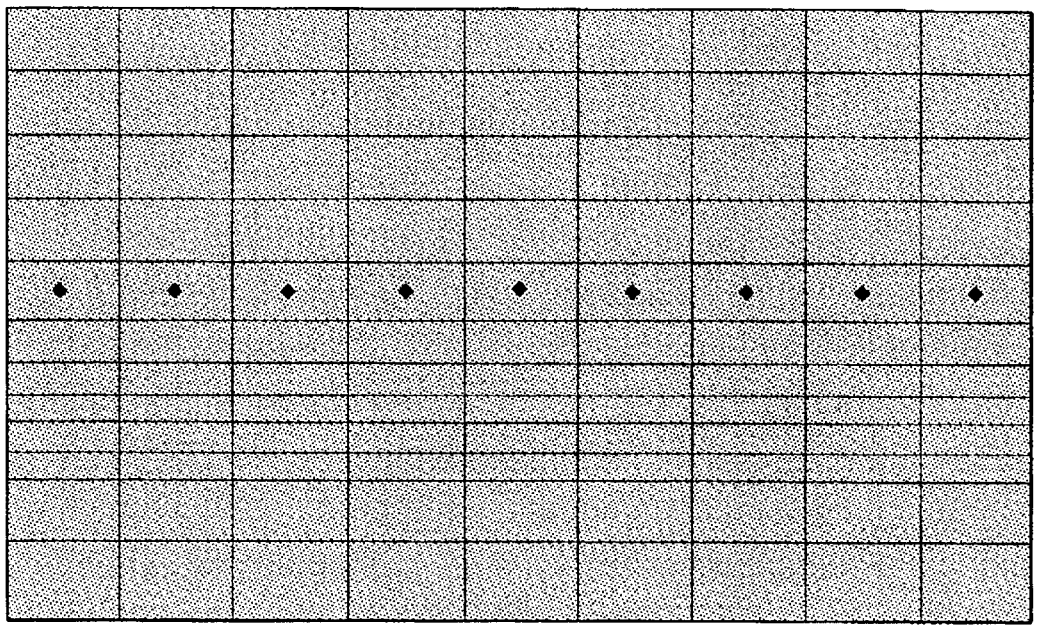
Figure 9I:
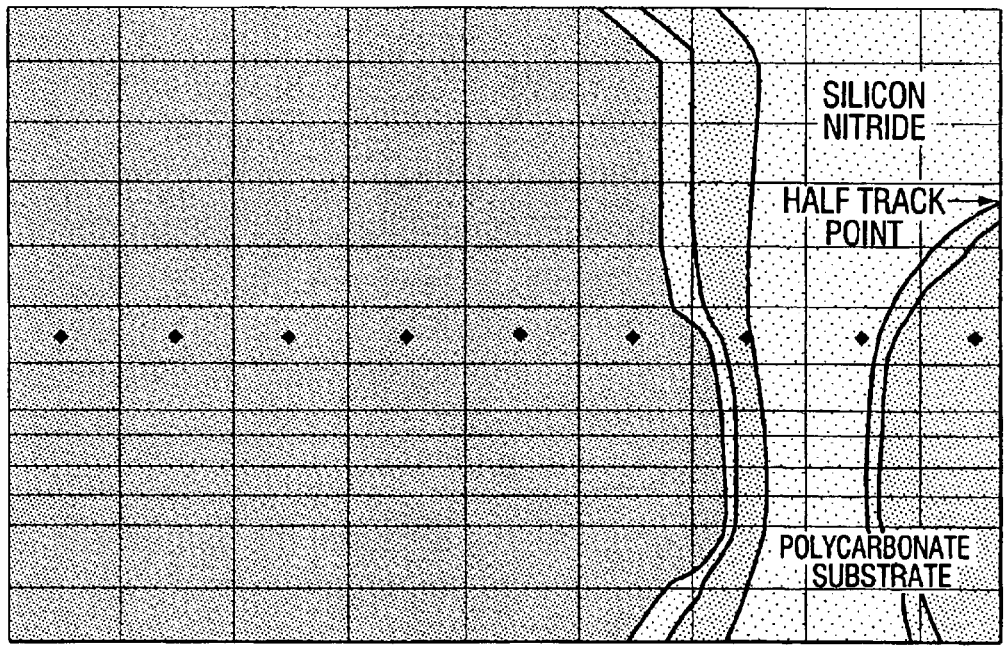

Referring now to FIGS. 9b–e, a representation of temperature profiles in a disk comprising mesas and no mesas is shown. FIGS. 9c–e show an exemplary temperature profile distribution in the disk 107 for three snapshots in time at 60, 90 and a 150 ns, after the outgoing laser beam 191 is applied as a 3 ns and 1 mW focused spot 348 with a full width half height maximum (FWHM=550 nm) at the track 103 center (upper left corner of each plot). The media 107 depth is in the Y direction and the radial direction of the disk is in the X direction. The left edge of the plot is a half-track point of 350 nm. The disk 107 film structure is 85 nm of silicon nitride, 20 nm of a storage and readout layer, 55 nm of aluminum on a polycarbonate substrate. The mesa 266 extension of the substrate rises to the bottom of the storage and readout layer so that the aluminum layer is broken. The width of the mesa is about 80 nm, which is centered at about 20 percent from the right edge of FIGS. 9c–e.

FIG. 9e shows the vertical temperature profile distribution in a disk with no channels or mesas at 60 ns after an outgoing laser beam is applied. The thermal gradients in the disk are very low. Note that the temperature and temperature per step in FIG. 9d is about one-third of that before FIG. 9a. this shows that for a disk 107 comprising mesas 266, that the temperature profile distribution at the storage and read layers is quite uniform at the track 103 center and that the thermal gradients are steep at the edge of the track.

In an exemplary embodiment, where continuous power is applied to generate heat, the heat will propagate as a wave between the mesas 266, with the heat remaining between the mesas 266 at four microns, or one microsecond after the spot 348 passes under the head 106 read/write elements, as is desired.

Figure 10A:
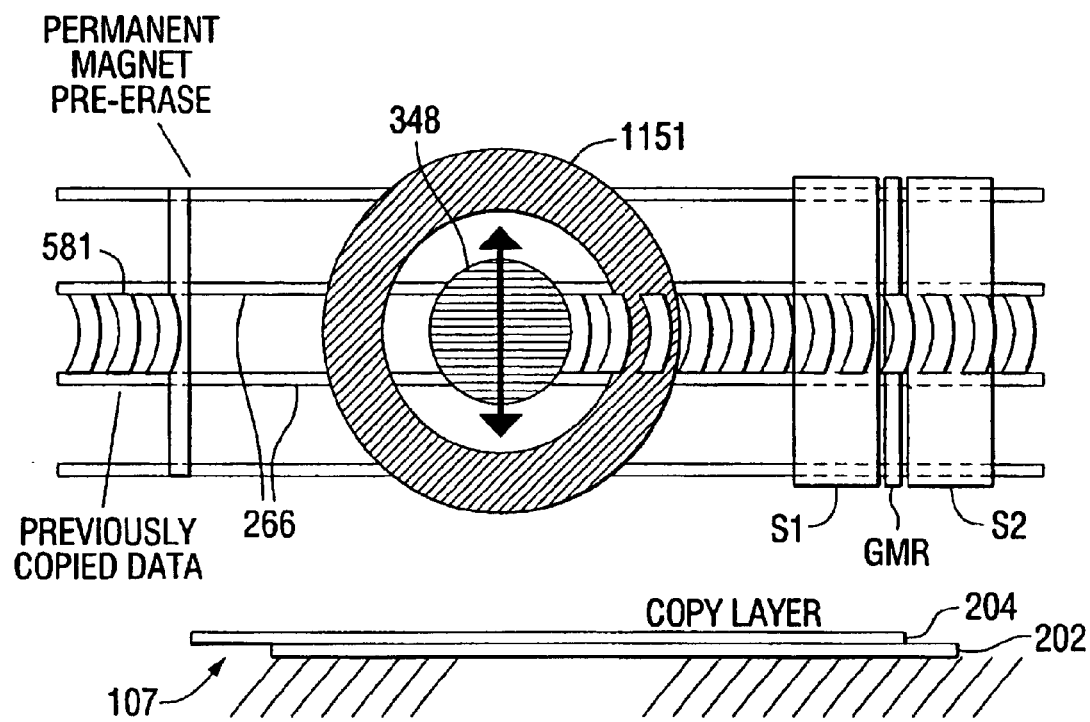
Figure 10B:
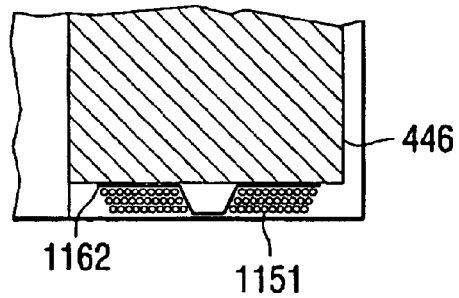

Referring now to FIG. 10a–b, there is seen still another variation of the flying head of the present invention. In this embodiment, the flying head 106 also utilizes the optical spot 348 to heat the disk 107 so as to read the magnetic data domain marks 281 with head elements S1, MR, S2, but unlike in the embodiments described above, writing of the data domain marks 281 to the storage layer 202 is done using a coil 1151 element. The coil 1151 is disposed beneath the objective optics 446 to generate a modulated magnetic field during a time the power of the outgoing laser beam 191 is maintained constant (a technique that is well known in the art as MFM). The data domain marks 281 are written vertically to the storage layer 202 by the coil 1151 and are typically crescent shaped. The magnetic field is preferably directed by utilizing a magnetic permalloy member 1162. The media in this embodiment may comprise a readout layer 204 in which the magnetic domains remain in their aligned orientation until erased by a pre/erase element. In this embodiment, it is a thermal gradient, rather than a magnetic field gradient that determines the radial edges of the data domain marks along the track 103. Inclusion of channels or mesas 266 aids in channeling the heat generated by the spot 348 such that the data domain marks 281 are less crescent shaped and more rectangular and/or square. It is understood that, as above, the pre/erase magnet 1064 and head element S1, MR, S2 width tolerances do not need to be as tight and that fabrication of the head elements S1, MR, S2 is made easier since for reading the data domain marks 281 they do not need to be close to the laser spot 348.

Other features and advantages of the present invention will become apparent to a person of skill in the art who studies the present invention disclosure. Therefore, the scope of the present invention is to be limited only by the following claims.

What is claimed is:

1. A magnetic recording and playback system comprising:
   (a) a magnetic data storage disk comprising:
       (i) multiple magnetically readable magnetic data tracks; and
       (ii) radial heat conduction interrupting features between the magnetic data tracks; and
   (b) a flying head positionable above the magnetic data storage disk and comprising:
       (i) at least one optical element for producing at least one laser spot on the storage disk which selectively heats the magnetic data tracks;
       (ii) at least one magnetic field writing element positioned to write data to the magnetic data tracks in an area heated by the laser spot; and
       (iii) at least one magneto-resistive sensing element positioned to read data by detecting a magnetic field from the magnetic data tracks.

2. The system of claim 1, wherein the radial heat conduction interrupting features comprise concentric rings.

3. The system of claim 1, wherein the radial heat conduction interrupting features comprise channels.

4. The system of claim 1, wherein the radial heat conduction interrupting features have heights measured in a direction perpendicular to the plane of the disk greater than or equal to the thickness of the magnetic data tracks.

5. The system of claim 1, wherein the radial heat conduction interrupting features are formed by depositing a material on the disk, and subsequently removing a portion of the deposited material to provide the radial heat conduction interrupting features.

6. The system of claim 1, wherein the radial heat conduction interrupting features are formed by depositing a material on the disk in a pattern which provides the radial heat conduction interrupting features.

7. The system of claim 1, wherein the radial heat conduction interrupting features comprise a material having a lower thermal conductivity than the magnetic data tracks.

8. The system of claim 1, wherein the magnetic data tracks comprise a single layer of amorphous material.

9. The system of claim 1, wherein the magnetic data tracks comprise al readout layer and a storage layer.

10. The system of claim 9, wherein the at least one magnetic field sensing element is positioned to read data in an area of the magnetic data tracks which is not heated by the laser spot.

11. The system of claim 1, wherein the at least one magnetic field sensing element is positioned to read data in the area heated by the laser spot.

12. The system of claim 1, wherein the magnetic data tracks comprise vertically oriented magnetic domains.

13. The system of claim 1, wherein the magnetic data tracks comprise horizontally oriented magnetic domains.

14. The system of claim 1, wherein the magnetic data tracks are located in the same plane.

15. The system of claim 1, wherein the magnetic data tracks comprise at least one magnetic layer located at a different level on the storage disk than the radial heat conduction interrupting features.

16. The system of claim 15, wherein the level of the at least one magnetic layer is above the radial heat conduction interrupting features.

17. The system of claim 1, wherein the at least one optical element comprises means for directing the laser spot radially across the storage disk.

18. The system of claim 17, wherein the means for directing the laser spot comprises a steerable mirror.

19. A magnetic recording and playback system comprising:
   (a) a magnetic data storage medium comprising:
      (i) multiple magnetically readable magnetic data tracks; and
      (ii) means for reducing radial heat conduction between adjacent magnetic data tracks; and
   (b) a flying head positionable above the magnetic data storage medium and comprising:
      (i) at least one optical element for producing at least one laser spot on the magnetic data storage medium which selectively heats the magnetic data tracks;
      (ii) at least one magnetic field writing element positioned to write data to the magnetic data tracks in an area heated by the laser spot; and
      (iii) at least one magneto-resistive sensing element positioned to read data by detecting a magnetic field from the magnetic data tracks.

20. The system of claim 19, wherein the means for reducing radial heat conduction between adjacent magnetic data tracks comprises radial heat conduction interrupting features between the magnetic data tracks.

21. The system of claim 20, wherein the radial heat conduction interrupting features comprise concentric rings.

22. The system of claim 20, wherein the radial heat conduction interrupting features comprise channels.

23. The system of claim 20, wherein the radial heat conduction interrupting features have heights measured in a direction perpendicular to the plane of the magnetic data storage medium greater than or equal to the thickness of the magnetic data tracks.

24. The system of claim 20, wherein the radial heat conduction interrupting features are formed by depositing a material on the magnetic data storage medium, and subsequently removing a portion of the deposited material to provide the radial heat conduction,interrupting features.

25. The system of claim 20, wherein the radial heat conduction interrupting features are formed by depositing a material on the magnetic data storage medium in a pattern which provides the radial heat conduction interrupting features.

26. The system of claim 20, wherein the radial heat conduction interrupting features comprise a material having a lower thermal conductivity than the magnetic data tracks.

* * * * *